(12) United States Patent
Korjus et al.

(10) Patent No.: US 12,093,045 B2
(45) Date of Patent: Sep. 17, 2024

(54) METHOD AND SYSTEM FOR OPERATING A MOBILE ROBOT

(71) Applicant: STARSHIP TECHNOLOGIES OÜ, Tallinn (EE)

(72) Inventors: Kristjan Korjus, Tallinn (EE); Joonatan Samuel, Tallinn (EE); Andre Veski, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 545 days.

(21) Appl. No.: 17/283,494

(22) PCT Filed: Oct. 14, 2019

(86) PCT No.: PCT/EP2019/077775
§ 371 (c)(1),
(2) Date: Apr. 7, 2021

(87) PCT Pub. No.: WO2020/078900
PCT Pub. Date: Apr. 23, 2020

(65) Prior Publication Data
US 2021/0397187 A1 Dec. 23, 2021

(30) Foreign Application Priority Data

Oct. 15, 2018 (EP) .................................. 18200330
Oct. 15, 2018 (EP) .................................. 18200374

(51) Int. Cl.
*G05D 1/00* (2024.01)
*G06V 20/20* (2022.01)
*G06V 20/58* (2022.01)

(52) U.S. Cl.
CPC .......... *G05D 1/0212* (2013.01); *G06V 20/20* (2022.01); *G06V 20/58* (2022.01); *G05D 1/0088* (2013.01);
(Continued)

(58) Field of Classification Search
CPC .. G05D 1/0212; G05D 1/0088; G05D 1/0231; G05D 1/0255; G05D 1/0257; G06V 20/20; G06V 20/58
See application file for complete search history.

(56) References Cited

U.S. PATENT DOCUMENTS 4,549,841 A  10/1985  Ishige
5,664,928 A   9/1997  Stauber
(Continued)

FOREIGN PATENT DOCUMENTS

GB    2569924 A      7/2019
WO    2011035839 A2  3/2011
(Continued)

OTHER PUBLICATIONS

Chand et al, "Navigation Strategy and path planning for autonomous road crossings by outdoor mobile robots", IEEE, whole document (Year: 2011).*
(Continued)

*Primary Examiner* — Hussein Elchanti
*Assistant Examiner* — Kenneth M Dunne
(74) *Attorney, Agent, or Firm* — Siritzky Law, PLLC

(57) ABSTRACT

A method for operating a robot traveling in an environment includes the robot sensing the environment and thereby creating sensor data; generating at least one probabilistic finding based on the sensor data, wherein the probabilistic finding is expressed as an object score and wherein the object score indicates a probability of detection of an object; setting at least one detection threshold; and, based on the at least one detection threshold, transforming the at least one probabilistic finding based on the sensor data to at least one discrete finding. The method is for operating a robot crossing a road. The robot is configured to be controlled by at least one human operator when crossing the road. Setting the
(Continued)

at least one detection threshold is based on a level of supervision by the at least one human operator when crossing the road.

35 Claims, 6 Drawing Sheets

(52) U.S. Cl.
CPC ......... *G05D 1/0231* (2013.01); *G05D 1/0255* (2013.01); *G05D 1/0257* (2013.01)

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Trevino et al. |
| 2015/0183581 | A1 | 7/2015 | Worsley |
| 2015/0202770 | A1 | 7/2015 | Patron et al. |
| 2015/0302258 | A1 | 10/2015 | Umezaki et al. |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2018/0020896 | A1 | 1/2018 | High et al. |
| 2018/0106885 | A1* | 4/2018 | Blayvas ................ G01S 13/931 |
| 2018/0137346 | A1* | 5/2018 | Mori ..................... G06V 40/20 |
| 2018/0232839 | A1 | 8/2018 | Heinla et al. |
| 2018/0259960 | A1* | 9/2018 | Cuban ................... B64D 47/08 |
| 2018/0349834 | A1 | 12/2018 | Heinla et al. |
| 2019/0262992 | A1* | 8/2019 | Kim ....................... B25J 9/1666 |
| 2019/0317497 | A1* | 10/2019 | Mere ................... G05D 1/0248 |
| 2020/0103523 | A1* | 4/2020 | Liu ......................... G01S 13/89 |

FOREIGN PATENT DOCUMENTS

| | | | |
|---|---|---|---|
| WO | 2017064202 | A1 | 4/2017 |
| WO | 2018098161 | A1 | 5/2018 |
| WO | 2018122803 | A1 | 7/2018 |

OTHER PUBLICATIONS

Anonymous: "Lieferroboter Starship: "Klauen wurde ich ihn nicht"—Auto—Tagesspiegel", Nov. 29, 2015, Retrieved from the Internet: URL: http://www.tagesspiegel.de/mobil/lieferroboter-starship-klauen-wuerde-ich-ihn-nicht/12647114.html (with English translation).

Baker M et al, "Automated Street Crossing for Assistive Robots", Rehabilitation Robotics, 2005. ICORR 2005. 9th International Conferenc E on Chicago, IL, USA Jun. 28-Jul. 1, 2005, Piscataway, NJ, USA,IEEE, (Jun. 28, 2005), p. 187-192, XP010830419.

Kimura N et al, "A Survey on Data Compression in Wireless Sensor Networks", Information Technology: Coding and Computing, 2005. ITCC 2005. Interna Tional Conference on Las Vegas, NV, USA Apr. 4-6, 2005, IEEE Computer Society, Los Alamitos, Calif. [U.A.], vol. 2, Apr. 4, 2005 (Apr. 4, 2005), p. 8-13.

Pettitt, Jeniece "Forget-delivery-drones-meet-your-new-delivery-robot", Nov. 2, 2015, Retrieved from the Internet: URL: https://www.cnbc.com/2015/11/02/forget-delivery-drones-meet-your-new-delivery-robot.html.

WIPO, International Preliminary Report on Patentability Chapter I, PCT/EP2019/077775, Apr. 20, 2021 (9p.).

WIPO, International Search Report, PCT/EP2019/077775, Apr. 23, 2020 (4p.).

WIPO, Written Opinion of the International Searching Authority, PCT/EP2019/077775, Apr. 23, 2020 (8p.).

EPO, Examination Report for European Application No. 19783562.2, Jun. 25, 2024. (5pages).

* cited by examiner (a)

(b)

(a)

(b)

METHOD AND SYSTEM FOR OPERATING A MOBILE ROBOT

RELATED APPLICATIONS

This application is the National Stage (a 371) of International Application No. PCT/EP2019/077775, filed Oct. 14, 2019, the entire contents of which are hereby fully incorporated herein by reference for all purposes. PCT/EP2019/077775 claims the priority benefit of European patent applications: (i) EP 18200374.9 and (ii) EP 18200330.1, both filed Oct. 15, 2018, the entire contents of both of which are hereby fully incorporated herein by reference for all purposes.

The invention relates to an autonomous or partly autonomous robot. More particularly, the present invention relates to controlling the operation of a robot that travels in an environment.

Recently, mobile robots have been increasingly deployed in outdoor environments. Such robots can be used for maintenance (such as grass mowing or snow cleaning), security (such as surveillance or patrolling), and services (such as carrying items or delivering parcels).

For example, Starship Technologies has disclosed and launched a mobile robot configured to transport items, such as to deliver them to recipients. The applicant's international patent application WO 2017/064202 A1 discloses such mobile delivery robots.

Mobile robots travelling outdoors are generally outfitted with a plurality of sensors allowing for autonomous or partly autonomous travel. Such sensors can allow the robots to build a computer vision picture of their surroundings, to perform navigation, mapping and localisation, and to avoid colliding with other traffic participants or stationary objects. The applicant's application WO 2017/064202 A1 also discloses a large number of such sensors that can be used in a complimentary way to ensure safe and efficient operation of mobile delivery robots. US 2015/0202770 A1 also discloses a robot configured to travel on a sidewalk.

Mobile delivery robots can generally travel on pedestrian pathways but may need to cross roads to get to their destinations. To ensure maximum safety of such crossings, a reliable detection of cars passing on the road to be crossed is beneficial.

Generally, there is a need to optimize system and methods relating to mobile robots travelling partly or fully autonomously. One aspect that may be prone to optimization is having the robots travelling as safely as possible, which can be achieved, among others, by detecting hazardous objects that the robot may collide with. Further, it may be desirable to increase the average travelling speed of the mobile robots, which can be achieved by avoiding unnecessary waiting that can be caused by false detections of hazardous objects that the robot may collide with. Further still, in case the robot is a partly autonomous robot, it may be desirable that the part of the robot travelling autonomously is as large as possible. That is, generally, it may be desirable to have the robot travel autonomously a percentage as high as possible while ensuring safe operation of the robot. While some attempts have been made to meet this aim, these attempts are still far from optimal.

Therefore, it is an object of the present invention to overcome or at least alleviate the shortcomings and disadvantages of the prior art. In particular, it is an object of the present invention to ensure safety of the travelling of the mobile robot while at the same time having the robot travel autonomously a percentage as high as possible.

These objects are met be the present invention.

In a first aspect, the present invention relates to a method for operating a robot which travels in an environment. The method comprises setting at least one detection threshold. Further, the method comprises, based on the at least one detection threshold, transforming at least one probabilistic finding based on sensor data to at least one discrete finding.

It will be understood that the robot travelling in the environment may generate sensor data. E.g., the robot may capture images by means of a camera to thus generate sensor data. The sensor data may be subjected to algorithms, e.g., pattern recognition algorithms. Thus, based on the sensor data, a probabilistic finding may be generated, i.e., a finding associated with a score or a probability. As a mere example, after capturing images at a road crossing, the robot may, based on these images (i.e., the sensor data), arrive at the finding that "There is a car approaching" with a likelihood of 80%. This may be an example for a probabilistic finding. E.g., to determine its behaviour, the robot may transform this probabilistic finding to a discrete (or definite) finding. Examples for such a discrete or definite finding may be "There is a car approaching" or "There is no car approaching". It will be understood that the robot's behaviour may depend on this definite finding.

Embodiments of the present technology help to transform the probabilistic finding to the discrete finding. More particularly, embodiments of the present technology relate to setting a threshold (which will be referred to as the detection threshold) defining which probabilistic findings will be mapped to which discrete finding. In the above example (with the probabilistic finding "There is a car approaching with w likelihood of 80%"), it will be understood that, e.g., setting the detection threshold to 90% will result a discrete finding of "There is no car approaching", while, e.g., setting the detection threshold to 75% will result in a discrete finding "There is a car approaching". In the former case, it is possible that the robot will cross the road (as the definite finding is "No car approaching"), while in the latter case (discrete finding: "Car approaching"), it may not cross the road, but may, e.g., request assistance from a human operator. It will generally be understood that the higher the detection threshold, the fewer instances will be considered as a positive detection, and the more autonomously the robot may operate (thus increasing the percentage of autonomous operation), while the lower the detection threshold, the more instances will be considered as a positive detection and the higher the frequency safety routines are employed by the robot (and the higher the safety of the robot). Embodiments of the present technology relate to setting the detection threshold to allow for an operation that is both safe and with a high percentage of autonomy.

That is, embodiments of the present invention relate to a method (and also a corresponding system) for setting detection thresholds. As the detection thresholds have an influence on detection sensitivities, the thresholds may also be referred to as detector sensitivity thresholds. Generally, the invention may be employed in mobile robots travelling on pedestrian pathways and crosswalks. More particularly, the invention relates to setting and/or adjusting sensitivity thresholds of detectors of a mobile robot. More specifically, the invention relates to determining optimal thresholds for detection of hazardous moving objects based on different parameters.

Generally, embodiments of the present invention may enable to reliably detect objects (such as cars), but also ensure that no unnecessary delays in road crossings occur due to false detections. This may be achieved by precisely setting predetermined thresholds for detecting objects, such as moving vehicles.

Generally speaking, embodiments of the presently described technology may also be understood to relate to a sensitivity system, as setting the detection thresholds influences the sensitivity. The sensitivity system may be designed to be an aggregator of the information that is known to the robot and aggregated together to make a judgment of the dangerousness level (i.e. based on the detectors), and understanding of the context and historical performance on safety metrics.

In the transforming step, a probabilistic finding below a detection threshold may be transformed to a first finding and a probabilistic finding above the detection threshold may be transformed to a second finding, the second finding being different from the first finding.

When setting the at least one detection threshold, a weather condition of the environment may be taken into account.

When setting the at least one detection threshold, a location of the robot may be taken into account. More particularly, historical safety data relating to the location may be taken into account.

When setting the at least one detection threshold, a visibility in the environment may be taken into account.

When setting the at least one detection threshold, a light condition of the environment may be taken into account.

When setting the at least one detection threshold, a time of the day, a day of the week, and/or holidays may be taken into account.

When setting the at least one detection threshold, an amount of traffic may be taken into account.

When setting the at least one detection threshold, traffic laws of the operating location may be taken into account.

The method may be for operating a robot crossing a road.

When setting the at least one detection threshold, a type of the road may be taken into account.

For example, a driveway may be treated differently from a public road.

When setting the at least one detection threshold, a number of lanes of the road may be taken into account.

When setting the at least one detection threshold, presence or absence of traffic lights may be taken into account.

When setting the at least one detection threshold, presence or absence of parking lanes may be taken into account.

When setting the at least one detection threshold, events in a vicinity of the location may be taken into account.

When setting the at least one detection threshold, a complexity of a situation encountered by the robot may be taken into account.

When setting the at least one detection threshold, historical data of the crossing may be taken into account.

When setting the at least one detection threshold, historical data of crossings similar to the crossing may be taken into account.

The method may comprise categorizing crossings into different categories and wherein crossings in the same category are considered as similar crossings.

When setting the at least one detection threshold, a distance travelled when crossing the road may be taken into account.

For example, a linear function may be used indicating that at 0m driven the detection threshold is 0.6 and goes up linearly to 0.9 (lot less sensitive) at 4 m and then after that is 1. Thus, the detection threshold may be very sensitive in the beginning (and thus more objects would be interpreted as cars), and then get successively less sensitive. Thus, the further the robot has travelled on the road, the less likely it becomes that an object is interpreted as a car and that a safety routine is performed. For example, at a detection threshold at 1, the robot would never jumps back because of the car (as the robot is already too far at the crossing).

When setting the at least one detection threshold, a movement status of the robot may be taken into account.

The movement status may be configured to assume a moving state and a stationary state.

More particularly, when the movement status is in the stationary state, the at least one detection threshold may be set to a stationary threshold, and when the movement status is in the moving state, the at least one detection threshold may be set to a moving threshold, wherein the moving threshold is greater than the stationary threshold.

It will be understood that the movement status may have impacts on the detectors. For example, when cameras are used as detectors, the images generated by the cameras may be of inferior quality when the robot is moving compared to the situation that the robot stands still. Generally, most of the input signals may be more noisy when the robot is driving. So, a high amount of the false positive detections (e.g., a car detected when there is actually no car) may come at points when the robot is moving. Again, it may be beneficial to make thresholds a bit less sensitive (i.e., increase the detection threshold) while moving and bit more sensitive when stationary (i.e., decrease the detection threshold). This may help to improve the overall safety level with the same false positive rate.

The method may further comprise determining the movement status.

The movement status may be determined based on movement data, wherein the movement data comprises data obtained by an accelerometer, a turning wheel detector, and/or the robot localizing itself.

The robot may be configured to be controlled by at least one human operator when crossing the road, and a level of supervision by the at least one human operator when crossing the road may be taken into account when setting the at least one detection threshold.

For example, the level of supervision may assume different configurations. Exemplary configurations of the level of supervision of a road crossing may include operator-free crossing, operator-triggered crossing, and/or operator controlled crossing. In the operator-free crossing, it is decided without human intervention when to cross the road and the road is crossed autonomously, i.e., the complete process of deciding when to cross the road and crossing the road is performed without the help of a human operator. This is the lowest level of supervision. In an operator-controlled crossing, the operator may decide when the robot crosses the road and the operator may also control the robot during the crossing. That is, the robot is remotely controlled during the entire crossing process. This is the highest level of supervision. In an operator-triggered crossing, the operator may decide when to cross the road, but the robot may then perform the road-crossing autonomously.

That is, after the operator has decided that the road is crossed, the robot travels autonomously. This is an intermediate level of supervision.

In embodiments of the present invention, the detection threshold is set by also taking into account the level of supervision. This may contribute to a safe and efficient operation of the robot.

More particularly, the lower the level of supervision, the lower the at least one detection threshold is set.

The robot may be configured to request assistance from at least one human operator.

When setting the at least one detection threshold, an availability of the at least one human operator may be taken into account.

When setting the at least one detection threshold, historical data on the robot's safety may be taken into account.

When setting the at least one detection threshold, a time waited at the crossing may be taken into account.

Generally, the detection thresholds may thus be static for a given crossing, or they may be dynamically adjusted. For example, the threshold values can be set once per a certain time interval for all robots (e.g. once per week), at the beginning of a given trip as part of the navigation planning and/or on the fly when the robot is approaching a particular road crossing. The parameters might be updated if an unexpected rate of crossing events is detected (e.g. too many near misses with moving cars).

The method may further comprise the robot sensing the environment and thereby creating the sensor data.

In the step of the robot sensing the environment, the robot may utilize sensors comprising at least one of, and preferably at least two of, a camera, a radar sensor, a time of flight sensor, a LIDAR sensor, an ultrasonic sensor, and a microphone.

The method may further comprise generating the at least one probabilistic finding based on the sensor data.

The probabilistic finding may be a score and particularly a probability.

The method may further comprise the robot crossing the road without requesting assistance from the at least one human operator in response to the first finding.

That is, the first finding may indicate to the robot that it may cross the road without a human operator controlling it or triggering the road crossing.

The method may further comprise the robot requesting assistance from the at least one human operator in response to the second finding.

The method may be carried out by a data processing system.

The robot may comprise a robot data processing component being a part of the data processing system, and the robot data processing component may set the at least detection threshold and transform the at least one probabilistic finding to the at least one discrete finding.

The data processing system may comprise a data processing device.

The data processing device may be external to the robot.

The data processing device may be a server.

That is, embodiments of the present technology also relate to the method being (at least partly) performed by a data processing device which is external to the robot.

The method may comprise: a plurality of robots sensing the environment and thereby creating the sensor data; transmitting the sensor data from the plurality of robots to the data processing device; and the data processing device performing at least one detection algorithm utilizing the sensor data to generate the at least one probabilistic finding.

The at least one detection algorithm may be a plurality of detection algorithms generating a plurality of probabilistic findings.

The method may comprise for each detection algorithm: setting a detection threshold combination comprising a detection threshold for each probabilistic finding, utilizing the detection threshold combination to generate a discrete finding for each probabilistic finding, and testing a validity for the detection threshold combination.

In other words, in embodiments of the present technology, sensor data may be collected in past trips, and may be stored, e.g., on a server. The sensor data may then be used to test one or more detection threshold combinations. Thus, new detection algorithms may be tested on old sensor data. This may be particularly useful, as it allows testing of new algorithms without the algorithms actually running on a robot that is operating. Thus, new algorithms can be tested without potentially posing a safety risk.

The method may comprise annotating the sensor data, the annotation relating to the validity of the at least one discrete finding.

The annotation may be utilized to test the validity for the detection threshold combination.

Testing the validity for the detection threshold combination may comprise testing an individual finding validity for each discrete finding, wherein the individual finding validity results in either one of a true positive finding, a true negative finding, a false positive finding, and a false negative finding, and wherein the detection threshold combination thus comprises a true positive rate, a true negative rate, a false positive rate, and a false negative rate. It will be understood that for further processing, any of these rates may be used, or any measure derived from these rates (e.g., positive predictive value, false omission rate, false discovery rate, negative predictive value).

The method may comprise: setting a plurality of detection threshold combinations, each detection threshold combination comprising a detection threshold for each probabilistic finding; utilizing each of the detection threshold combinations to generate a discrete finding for each probabilistic finding; and testing a validity for each of the detection threshold combinations.

For each of the detection threshold combinations, the method may comprise the steps recited in the penultimate paragraph.

The method may comprise setting a false positive rate, and finding the detection threshold combination having a false positive rate not exceeding the set false positive rate and having the highest true positive rate of the plurality of detection threshold combinations.

The method may comprise utilizing the found detection threshold combination to operate the robot.

The method may further comprise processing the sensor data to generate processed sensor data, wherein the at least one detection algorithm utilizes the processed sensor data to generate the at least one probabilistic finding.

The processed sensor data may comprise a velocity, a size and/or a speed of an object.

A ratio of data size between the sensor data and the processed sensor data may be greater than 10, preferably greater than 1,000, further preferably greater than 100,000, such as greater than 1,000,000.

Thus, a substantial reduction of the sensor data to the processed sensor data may be achieved. For example, the sensor data may be video streams requiring 100 MB/s. If processing these sensor data to just include detected car sensor data, the corresponding data may only require approximately 0.1 KB/s. This is reduction of 1 000 000 times in data. However, it will be understood that it is also possible to save a more than just all dangerous cars. For example, it is also possible that all data relating to detections from all cars and potential cars are processed. This would be less than 1 KB/s, corresponding to a reduction of more than 100 000 times. Also, if considering radar data, a reduction of only about 100 times could apply (as the radar "raw" signal is not so large).

The step of processing the sensor data may be at least partly performed by the plurality of robots, and the transmitted sensor data may be at least partly processed.

The step of processing the sensor data may be at least partly performed by the data processing device.

That is, embodiments of the present invention also relate to collecting a huge collection of annotated data and then utilizing this collection to find detections by all detection algorithms. Then different threshold combinations may be tried out. Some amount of false positives that would still be acceptable may be pre-set. And for that level a best combination of thresholds may be found such that the total recall of detected cars would be maximum.

The present invention also relates to a system for carrying out the method discussed above.

The present invention also relates to a use of the system discussed above for carrying out the method discussed above.

That is, in general words, embodiments of the present invention are concerned with setting and adjusting thresholds used to determine whether a specific detector of the robot detected an object (such as a vehicle) or not. The detectors of the present technology may be algorithms or modules that the robot runs as part of its operation. The present technology may be used for operator-controlled crossings, operator triggered autonomous crossings (operator authorizes the crossing, but the robot does it on its own) and automatic autonomous crossings (robot authorizes the crossing on its own and crosses autonomously).

For example, one car detector on the robot might only use visual cameras data to detect approaching vehicles. Images collected by the cameras might be pre-processed and analysed by the detector to output a certain score indicative of the probability that a hazardous moving object (generally a vehicle) was detected. Another detector might use the radar or the ToF camera. Another one might combine data from a few sensors and output a collective score.

Depending on the set thresholds (that may be preselected), the score gets converted into a binary result: car(s) detected/not detected. Based on this output (performed in real time), the robot (and/or the operator) might decide to start crossing the road or wait longer.

That is, embodiments of the present invention may generally employ the following features: setting of detection thresholds based on various parameters and adjusting the thresholds depending on various parameters. Thus, a reliable and efficient way of ensuring safe road crossings for mobile robots while optimizing speed of road crossings may be provided. In embodiments of the present invention, the thresholds may be dynamically adjusted.

The present invention is also defined by the following numbered embodiments.

Below, method embodiments will be discussed. These embodiments are abbreviated with the letter "M" followed by a number. Whenever reference is herein made to method embodiments, these embodiments are meant.

M1. A method for operating a robot travelling in an environment, the method comprising setting at least one detection threshold, and based on the at least one detection threshold, transforming at least one probabilistic finding based on sensor data to at least one discrete finding.

M2. The method according to the preceding embodiment, wherein in the transforming step, a probabilistic finding below a detection threshold is transformed to a first finding and a probabilistic finding above the detection threshold is transformed to a second finding, the second finding being different from the first finding.

M3. The method according to any of the preceding embodiments, wherein when setting the at least one detection threshold, a weather condition of the environment is taken into account.

M4. The method according to any of the preceding embodiments, wherein when setting the at least one detection threshold, a location of the robot is taken into account.

M5. The method according to the preceding embodiment, wherein historical safety data relating to the location is taken into account.

M6. The method according to any of the preceding embodiments, wherein when setting the at least one detection threshold, a visibility in the environment is taken into account.

M7. The method according to any of the preceding embodiments, wherein when setting the at least one detection threshold, a light condition of the environment is taken into account.

M8. The method according to any of the preceding embodiments, wherein when setting the at least one detection threshold, a time of the day, a day of the week, and/or holidays are taken into account.

M9. The method according to any of the preceding embodiments, wherein when setting the at least one detection threshold, an amount of traffic is taken into account.

M10. The method according to any of the preceding embodiments, wherein when setting the at least one detection threshold, traffic laws of the operating location are taken into account.

M11. The method according to any of the preceding embodiments, wherein the method is for operating a robot crossing a road.

M12. The method according to the preceding embodiment, wherein when setting the at least one detection threshold, a type of the road is taken into account.

M13. The method according to any of the 2 preceding embodiment, wherein when setting the at least one detection threshold, a number of lanes of the road is taken into account.

M14. The method according to any of the 3 preceding embodiment, wherein when setting the at least one detection threshold, presence or absence of traffic lights is taken into account.

M15. The method according to any of the 4 preceding embodiment, wherein when setting the at least one detection threshold, presence or absence of parking lanes is taken into account.

M16. The method according to any of the preceding embodiments, wherein when setting the at least one detection threshold, events in a vicinity of the location are taken into account.

M17. The method according to any of the preceding embodiments, wherein when setting the at least one detection threshold, a complexity of a situation encountered by the robot is taken into account.

M18. The method according to any of the preceding embodiments with the features of embodiment M11, wherein when setting the at least one detection threshold, historical data of the crossing is taken into account.

M19. The method according to any of the preceding embodiments with the features of embodiment M11, wherein when setting the at least one detection threshold, historical data of crossings similar to the crossing is taken into account.

M20. The method according to the preceding embodiment, wherein the method comprises categorizing crossings into different categories and wherein crossings in the same category are considered as similar crossings.

M21. The method according to any of the preceding embodiments with the features of embodiment M11, wherein when setting the at least one detection threshold, a distance travelled when crossing the road is taken into account.

M22. The method according to any of the preceding embodiments, wherein when setting the at least one detection threshold, a movement status of the robot is taken into account.

M23. The method according to the preceding embodiment, wherein the movement status is configured to assume a moving state and a stationary state.

M24. The method according to the preceding embodiment, wherein
when the movement status is in the stationary state, the at least one detection threshold is set to a stationary threshold, and
when the movement status is in the moving state, the at least one detection threshold is set to a moving threshold,
wherein the moving threshold is greater than the stationary threshold.

M25. The method according to any of the 3 preceding embodiments, wherein the method further comprises determining the movement status.

M26. The method according to the preceding embodiment, wherein the movement status is determined based on movement data, wherein the movement data comprises data obtained by an accelerometer, a turning wheel detector, and/or the robot localizing itself.

M27. The method according to any of the preceding embodiments with the features of embodiment M11, wherein
the robot is configured to be controlled by at least one human operator when crossing the road, and wherein
a level of supervision by the at least one human operator when crossing the road is taken into account when setting the at least one detection threshold.

M28. The method according to the preceding embodiment, wherein the lower the level of supervision, the lower the at least one detection threshold is set.

M29. The method according to any of the preceding embodiments, wherein the robot is configured to request assistance from at least one human operator.

M30. The method according to the preceding embodiment, wherein when setting the at least one detection threshold, an availability of the at least one human operator is taken into account.

M31. The method according to any of the preceding embodiments, wherein when setting the at least one detection threshold, historical data on the robot's safety is taken into account.

M32. The method according to any of the preceding embodiments with the features of embodiment M11, wherein when setting the at least one detection threshold, a time waited at the crossing is taken into account.

M33. The method according to any of the preceding embodiments, wherein the method further comprises the robot sensing the environment and thereby creating the sensor data.

M34. The method according to the preceding embodiment, wherein in the step of the robot sensing the environment, the robot utilizes sensors comprising at least one of, and preferably at least two of, a camera, a radar sensor, a time of flight sensor, a LIDAR sensor, an ultrasonic sensor, and a microphone.

M35. The method according to any of the preceding embodiments, wherein the method further comprises generating the at least one probabilistic finding based on the sensor data.

M36. The method according to any of the preceding embodiments, wherein the probabilistic finding is a score and particularly a probability.

M37. The method according to any of the preceding embodiments with the features of embodiments M2, M11 and M29, wherein the method further comprises the robot crossing the road without requesting assistance from the at least one human operator in response to the first finding.

M38. The method according to any of the preceding embodiments with the features of embodiments M2, M11 and M30, wherein the method further comprises
the robot requesting assistance from the at least one human operator in response to the second finding.

M39. The method according to any of the preceding embodiments, wherein the method is carried out by a data processing system.

M40. The method according to the preceding embodiments, wherein the robot comprises a robot data processing component being a part of the data processing system, wherein the robot data processing component sets the at least detection threshold and transforms the at least one probabilistic finding to the at least one discrete finding.

M41. The method according to any of the 2 preceding embodiments, wherein the data processing system comprises a data processing device.

M42. The method according to the preceding embodiment, wherein the data processing device is external to the robot.

M43. The method according to any of the 2 preceding embodiments, wherein the data processing device is a server.

M44. The method according to any the 3 preceding embodiments, wherein the method comprises
a plurality of robots sensing the environment and thereby creating the sensor data;
transmitting the sensor data from the plurality of robots to the data processing device; and
the data processing device performing at least one detection algorithm utilizing the sensor data to generate the at least one probabilistic finding.

M45. The method according to the preceding embodiment, wherein
the at least one detection algorithm is a plurality of detection algorithms generating a plurality of probabilistic findings.

M46. The method according to any of the 2 preceding embodiments, wherein the method comprises for each detection algorithm:
setting a detection threshold combination comprising a detection threshold for each probabilistic finding,
utilizing the detection threshold combination to generate a discrete finding for each probabilistic finding, and
testing a validity for the detection threshold combination.

M47. The method according to any of the preceding embodiments, wherein the method comprises
annotating the sensor data, the annotation relating to the validity of the at least one discrete finding.

M48. The method according to the preceding embodiment and with the features of the penultimate embodiment, wherein the annotation is utilized to test the validity for the detection threshold combination.

M49. The method according to any of the preceding embodiments with the features of embodiment M46,
wherein testing the validity for the detection threshold combination comprises testing an individual finding validity for each discrete finding,
wherein the individual finding validity results in either one of a true positive finding, a true negative finding, a false positive finding, and a false negative finding,
wherein the detection threshold combination thus comprises a true positive rate, a true negative rate, a false positive rate, and a false negative rate.

M50. The method according to any of the preceding embodiments with the features of embodiment M46, wherein the method comprises
setting a plurality of detection threshold combinations, each detection threshold combination comprising a detection threshold for each probabilistic finding,
utilizing each of the detection threshold combinations to generate a discrete finding for each probabilistic finding,
testing a validity for each of the detection threshold combinations.

M51. The method according to the preceding embodiment, wherein the method comprises the steps of the penultimate embodiment for each of the detection threshold combinations.

M52. The method according to the preceding embodiment, wherein the method comprises
setting a false positive rate, and
finding the detection threshold combination having a false positive rate not exceeding the set false positive rate and having the highest true positive rate of the plurality of detection threshold combinations.

M53. The method according to the preceding embodiment, wherein the method comprises
utilizing the found detection threshold combination to operate the robot.

M54. The method according to any of the preceding embodiments and with the features of embodiment M44, wherein the method further comprises
processing the sensor data to generate processed sensor data, wherein the at least one detection algorithm utilizes the processed sensor data to generate the at least one probabilistic finding.

M55. The method according to the preceding embodiment, wherein the processed sensor data comprises a velocity, a size and/or a speed of an object.

M56. The method according to any of the 2 preceding embodiments, wherein a ratio of data size between the sensor data and the processed sensor data is greater than 10, preferably greater than 1,000, further preferably greater than 100,000, such as greater than 1,000,000.

M57. The method according to any of the 3 preceding embodiments, wherein the step of processing the sensor data is at least partly performed by the plurality of robots, and wherein the transmitted sensor data is at least partly processed.

M58. The method according to any of the 4 preceding embodiments and with the features of embodiment M42, wherein the step of processing the sensor data is at least partly performed by the data processing device.

Below, system embodiments will be discussed. These embodiments are abbreviated with the letter "S" followed by a number. Whenever reference is herein made to system embodiments, these embodiments are meant.

S1. A system for carrying out the method according to any of the preceding method embodiments.

Below, use embodiments will be discussed. These embodiments are abbreviated with the letter "U" followed by a number. Whenever reference is herein made to use embodiments, these embodiments are meant.

U1. Use of the system according to the preceding system embodiments for carrying out the method according to any of the preceding method embodiments.

DETAILED DESCRIPTION OF THE FIGURES

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, time delays between steps can be present between some or all of the described steps.

Figure 1:
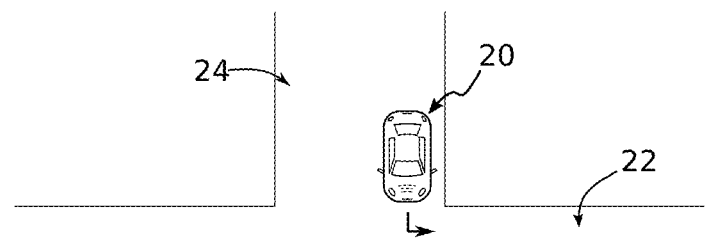
FIG. 1 depicts two scenarios of a mobile robot travelling on a road crossing.
Figure 1:
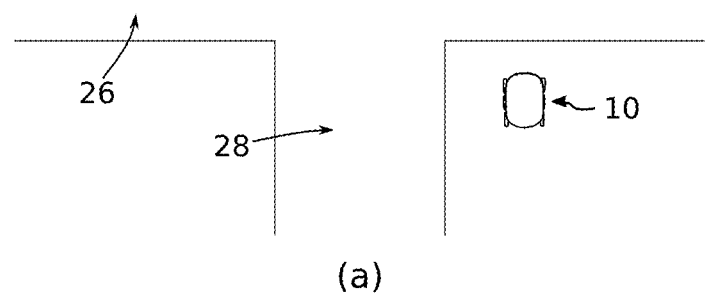

FIG. 1 depicts a mobile robot 10 travelling in an environment. The mobile robot 10 may be fully or partly autonomous. For example, the mobile robot 10 can comprise any of the automation levels defined by the Society of Automotive Engineers (SAE) in J3016 Autonomy Levels. SAE defines 6 automation levels, ordered from 0 to 5, with 5 being a full automation level and wherein the mobile robot 10 preferably comprises the automation levels 1 to 5. In some embodiments, the mobile robot 10 can be a fully autonomous mobile robot 10 (e.g. level 5 according to SAE). That is, the fully autonomous mobile robot 10 can navigate, drive and execute other functionalities related to its operation on its own, without a human operator controlling it. In some embodiments, the mobile robot 10 can be nearly or partly autonomous (e.g. any of levels 1 to 4 according to SAE). That is, the nearly autonomous mobile robot 10 can in some instances and/or for some functionalities operate on its own and in some other instances and/or other functionalities be assisted by a human operator.

Such a robot 10 may generally be configured to travel (i.e. drive) on sidewalks and/or bike lanes and/or driveways. However, the mobile robot 10 may sometimes be required to cross roads (i.e. vehicle roads). As will be understood, generally travelling on roads or crossing roads may require be more hazardous compared to, for example, instances when the mobile robot 10 travels on sidewalks. Due to driving vehicles on the road, road crossings may provide higher chances of collisions.

FIG. 1a depicts a mobile robot 10, positioned on a sidewalk, intending to cross road 22. At the same time, the moving vehicle 20, driving on the road 24, intends to take a left turn (from the vehicle's perspective) into the road 22. Obviously, trajectories of the moving vehicle 20 and the mobile robot 10 traverse each-other. To ensure safety (i.e. avoid collision), either the moving car 20 or the mobile robot 10 need to wait for the other to pass.

Thus, it can be advantageous for the mobile robot 10 to comprise at least one detector that can allow the mobile robot 10 to detect the vehicle 20. One such detector, can be the detector apparatus 30, discussed in FIG. 3. The detector apparatus 30 can allow the mobile robot 10 to detect the moving vehicle 20 and evaluate a dangerous level of the scenario (e.g. a probability of collision). This may allow the mobile robot 10 to determine not to cross the road 22 or wait for the moving vehicle 20 to cross the road—thus ensuring safety of the moving vehicle 20, mobile robot 10, as well as the safety of other traffic participants.

FIG. 1b depicts a similar scenario to FIG. 1a. The mobile robot 10, positioned on a sidewalk, intends to cross road 22. In the same time, a moving vehicle 20, driving on road 24, is turning right (according to vehicle's perspective) into the road 26. As discussed, the mobile robot 10 can comprise at least one detector, such as the detector apparatus 30 (see FIG. 3). The detector apparatus 30 can allow the mobile robot 10 to detect the presence of the moving vehicle 20.

It can be seen that the trajectories of the moving vehicle 20 and the mobile robot 10 do not obstruct each other, hence both the moving vehicle 20 and the mobile robot 10 can cross the road simultaneously without colliding with each other. Thus, the mobile robot 10 can cross the road 22 without having to wait for the moving vehicle 20. This can contribute to avoid unnecessary waiting of the mobile robot 10 which can increase the average travelling speed of the mobile robot 10. A higher average travelling speed of the mobile robot 10 can contribute on the mobile robot 10 finishing its tasks faster and consuming less energy for the completion of its tasks.

Thus, as illustrated in the two scenarios depicted in FIGS. 1a and 1b, it can be advantageous for a mobile robot 10 to comprise at least one detector, such as the detector apparatus 30 (see FIG. 3), which can allow the mobile robot 10 to detect at least one object, such as the moving vehicle 20. Further, it can be advantageous for the mobile robot 10 to evaluate a dangerous level (e.g. a probability of true detection, a probability of collision) of the scenario and take precautions to ensure safety, if necessary. One such precaution can be waiting for a moving vehicle 20 to pass, as illustrated in FIG. 1a.

Even though precautions may be necessary in some instances (e.g. in the scenario of FIG. 1a), they may be unnecessary in some other instances (e.g. in the scenario of FIG. 1b). That is, it may be necessary for the robot 10 to wait for the moving vehicle 20 to pass in FIG. 1a but it may not be necessary for the robot 10 to wait for the moving vehicle 20 in FIG. 1b. Thus, it may be advantageous not only to detect an object, such as a moving vehicle 20, but to also evaluate such detection and determine an action of the mobile robot 10 such that maximum safety is ensured while at the same time keeping the average traveling speed of the robot 10 high (e.g. avoid unnecessary waiting).

The mobile robot 10 can be configured to travel at low speeds, such as, 0-30 km/h, or no more than 8 km/h, or no more than 6 km/h. It will be understood that whenever discussing maximizing the average speed of the robot 10 or keeping the average traveling speed of the robot 10 high, the average speed of the mobile robot 10 does not exceed the maximum configured speed that the mobile robot 10 can travel and it can be maximized within a maximum limit.

Figure 2:
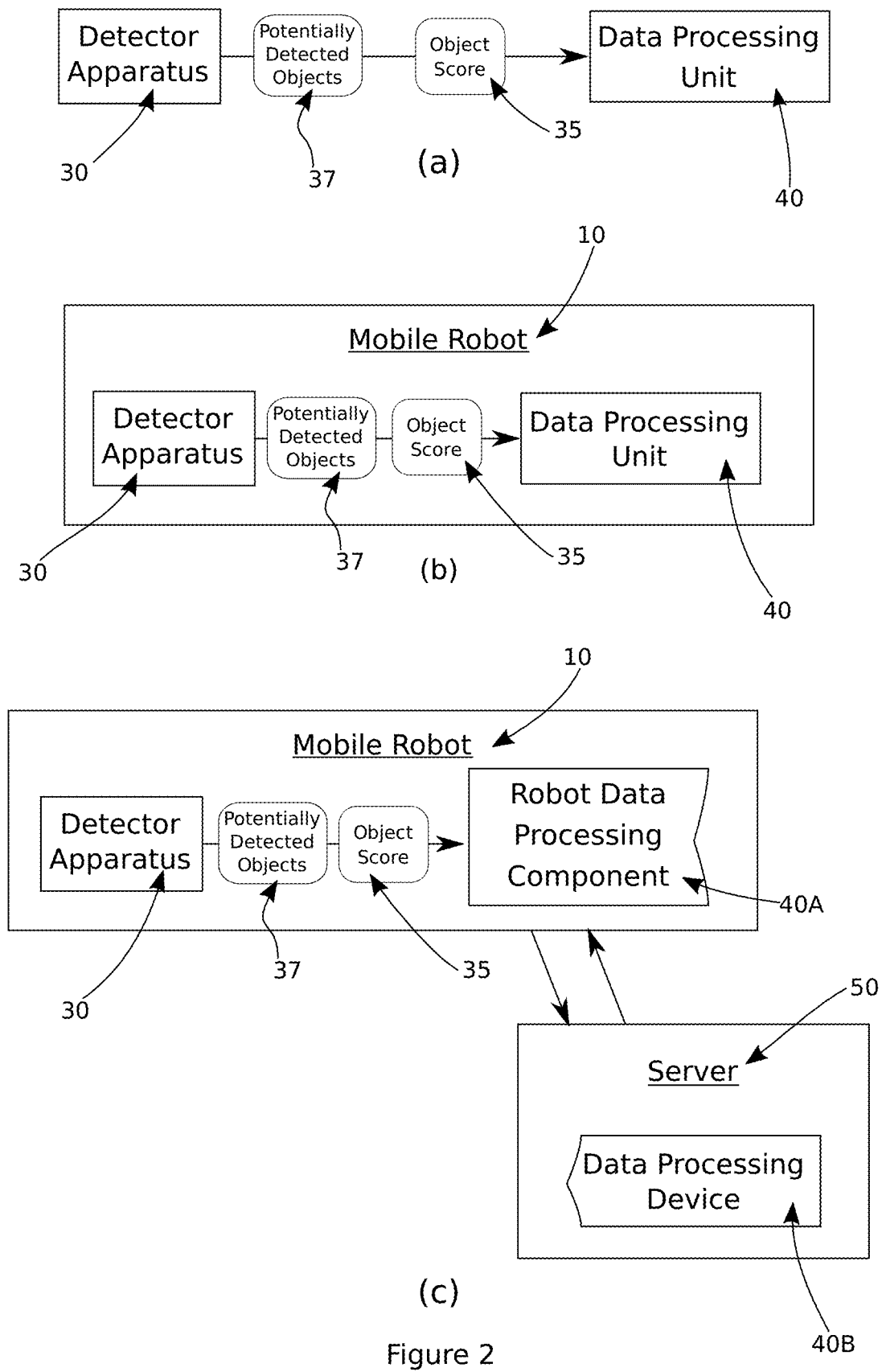
FIG. 2 depicts different embodiments of a system configured for detecting objects.

FIG. 2 depicts system and method embodiments configured for detecting at least one object in an environment.

FIG. 2a depicts a system comprising a detector apparatus 30 and a data processing unit 40. As will become more apparent in the discussion of FIG. 3, the detector apparatus can be configured to output a list of potentially detected objects 37. The list of potentially detected objects 37 can be configured to indicate the potential presence of at least one object (e.g. a vehicle). Further, the detector apparatus 30 can assign an object score 35 to each or to at least one of the potentially detected objects 37. The object score 35 can indicate a probability of the detection of an object (i.e. probability that the potentially detected object 37 is actually present). Alternatively or additionally, the object score 35 may indicate a dangerous level, such as, the probability that object can be an hazardous object (i.e. prone to causing a collision). For example, referring to FIG. 1, the moving vehicle 20 in the scenario of FIG. 1a can have a lower object score 35 (or dangerous level) than the moving vehicle 20 in the scenario of FIG. 1b.

The output of the detector apparatus 30 can be provided to a data processing unit 40. As will become apparent in FIG. 4, the data processing unit 40 can be configured to determine at least one detection threshold 43 (see FIG. 4a). The detection threshold 43 may also be referred to as detection probability threshold 43. Further, the detection threshold 43 can be used to map the objects scores 35 into two or more categories or decisions. Hence, the data processing unit 40 can output a score-to-decision mapping 45 (see FIG. 4b). The detection threshold 43 and the score-to-decision mapping 45 can be used to determine an action. For example, the dangerous level of an object, represented by the object score 35, can be mapped into one of the following decisions: "hazardous object" or "not hazardous object" and based on the mapping an action can be performed, e.g. take precautions when object determined as "hazardous object" or do not take precautions when object determined as "not hazardous object".

In some embodiments, as depicted in FIG. 2b, the detector apparatus 30 and the data processing unit 40 can be part of a mobile robot 10 (in such cases, the data processing unit 40 may also be referred to as robot data processing component), wherein they can facilitate the driving of the mobile robot 10. More particularly, the detector apparatus 30 can allow the mobile robot 10 to build a computer vision picture of its surrounding by sensing and detecting the presence of potential objects 37 and the detector apparatus 30 can evaluate such detections and determine decisions regarding the mobile robot's driving and/or whether the detections where true or false detections.

For example, referring to FIG. 1, the mobile robot 10 can comprise the detector apparatus 30 which can allow the mobile robot 10 to detect the moving vehicle 20. The detector apparatus 30 may output the list of potentially detected objects 37 (indicating the potential presence of the vehicle 20) and the object score 35 (indicating the probability of detection of the potential object 37 and/or the hazardousness level of the potential object 37). Further, the robot 10 can comprise a data processing unit 40 (i.e., a robot data processing component 40) and the output from the detector apparatus 30 can be provided to the data processing unit 40. The data processing unit 40 can use the output of the detector apparatus 30 (i.e. the potential detected object 37 and object score 35) to determine whether the potential object 37 is actually present and/or a dangerous level of the potential object 37 and/or whether to cross the road. For example, in the scenario of FIG. 1a the data processing unit 40 may determine to not cross the road and in the scenario of FIG. 1b to cross the road.

A further system embodiment is depicted in FIG. 2c. In this embodiment, the mobile robot 10 comprises the detector apparatus 30. Further, the mobile robot 10 comprises only part of the data processing unit 40 (the part comprised by the robot 10 may also be referred to as the robot data processing component), while the other part of the data processing unit 40 can be comprised in a server 50 (which may be referred to as a data processing device). It will be understood that the combination of the robot data processing component and the external data processing device may also be referred to as a data processing system. That is, part of functionalities of the data processing unit 40 can be done by the robot data processing components 40A of the mobile robot 10 and the other part of the functionalities of the data processing unit 40 can be partly conducted by the server 50 (or more particularly by the data processing device 40B of the server 50). As the output of the operations of the part of the robot data processing component 40A comprised by the mobile robot 10 may be required by server 50, a data communication link can be established between the mobile robot 10 and the server 50. For example, an Internet connection can be realized between the mobile robot 10 and the server 50.

In one particular example, the robot data processing components 40A can conduct a pre-processing of the data output by the detector apparatus 30 and provide some intermediate data as output. Such intermediate data can then be transmitted to the server 50 which can further process the intermediate data and generate a detection threshold 43 and a score-to-decision mapping 45 which can be transmitted to the robot 10. Conducting part of the operations of the data processing unit 40 in the server 50, can be advantageous as the server 50 can comprise further data, such as the threshold parameters 60 and the historical data 62 (see FIG. 4). Hence, the need to transmit such data from the server 50 to the mobile robot 10 may be avoided. Similarly, it may be easy to install large memory devices on the server 50 (which can be needed to store the threshold parameters 60 and the historical data 62), while the memory that can be installed on the mobile robot 10 can be limited due to the mobile robot 10 physical size.

Figure 3:
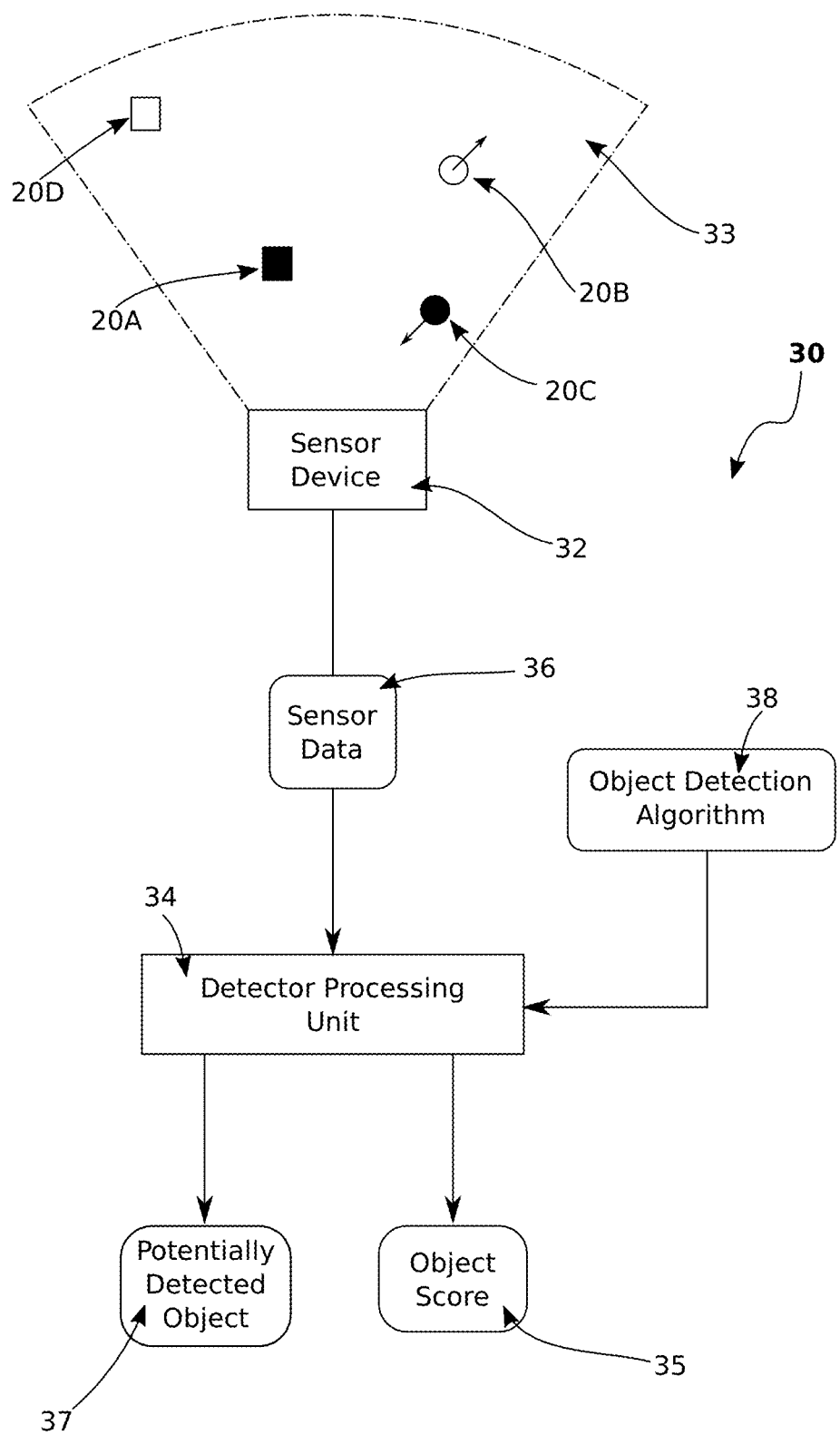
FIG. 3 depicts an embodiment of a detector apparatus.

FIG. 3 depicts an embodiment of the detector apparatus 30. The detector apparatus 30 can be configured for sensing an environment and for extracting certain information from the environment. The detector apparatus 30 can be mounted on a mobile robot 10 and can allow the mobile robot 10 to build a computer vision picture of its surrounding. For example, the mobile robot 10 can use the detector apparatus 30 to detect objects, extract information regarding the detected objects (e.g. velocity, size, type of object) and information related to the environment wherein the robot 10 can be positioned (e.g. sidewalk, driveway, road crossing, traffic density, type of road, number of lanes in a road, weather conditions, etc.).

Thus, the detector apparatus 30 can comprise at least one sensor device 32 facilitating the sensing of an environment. The environment sensed by the sensor device 32 is referred to as the detection area 33. The at least one sensor device 32 can be, e.g., a camera, a radar, and/or a time-of-flight (ToF) camera, a LIDAR, an ultrasonic and/or a microphone sensor.

In general, the sensor device 32 can be any sensor that can facilitate the creation of machine (or computer) vision or that can allow a machine (such as the mobile robot 10) to gain information on its surrounding or that can facilitate an operator (such as an operator of the mobile robot 10) to gain information on the sensed environment.

In FIG. 3 the detector apparatus 30 is illustrated comprising only one sensor device 32. However, it will be understood that in general the detector apparatus 30 can comprise any number of sensor devices 32. Moreover, the detector apparatus 30 can comprise different types of sensor devices 32. Additionally, the detector apparatus 30 can comprise any combination of sensor devices 32, e.g. at least one radar and at least one camera and at least one ToF camera.

For example, a mobile robot 10, comprising a detector apparatus 30, can be equipped with one or more sensor devices 32. The mobile robot 10 can be equipped with at least one camera 32 that can be mounted on different parts of the mobile robot 10, such as, on the front and/or on the back and/or on the sides of the robot 10. Alternatively or additionally, the mobile robot 10 can be equipped with at least one radar 32, which similar to the at least one camera 32, can be mounted on different parts of the mobile robot 10. Further still, the mobile robot 10 can be equipped with at least one ToF cameras 32 and/or at least one LIDARs 32.

The sensor device 32 can thus be configured to sense an environment and output sensor data 36. The type of sensor data 36 depends on the type of sensor device 32. That is, a camera 32 can output at least one visual image 36 (or video 36), hence facilitating the detection of an object 20 and/or determination of the object's size, type and/or distance to the object 20. A radar 32 can output a radar output (which may also be referred to as a radar image 36) that can indicate the reflectivity of objects in the surroundings, hence facilitating the detection of an object 20 and/or object's velocity and/or distance to object 20. A ToF camera can output a range image 36 indicating distance to objects in the surrounding, hence facilitating a determination of a distance to an object 20.

In the above, only some specific examples of the sensor data 36 were provided. It will be understood, that in general the sensor data 36 can be in any format, based on the type of sensor device 32 outputting the sensor data 36.

Further, the detector apparatus 30 can comprise a detector processing unit 34. For example, each sensor device 32 can be connected to a respective detector processing unit 34 or multiple sensor device 32 can share a detector processing unit 34.

The sensor data 36 can be fed to the detector processing unit 34. The detector processing unit 34 can be configured to execute an object detection algorithm 38. Thus, the detector processing unit 34 using the object detection algorithm 38 (for example, provided to the detector processing unit 34 as machine instructions) can process the sensor data 36 to output a list of potentially detected objects 37 and a respective list of object scores 35, e.g., probabilities that objects were detected.

The detector processing unit 34 can be configured for analysing the sensor data 36 to determine the presence of a particular object 20, such as a vehicle 20 and/or pedestrian 20 and/or bike 20, in the detection area 33.

For example, the detector processing unit 34 can be configured to detect vehicles 20 using images 36 from a camera 32. Hence, the object detection algorithm 38 can be configured as a vehicle detection algorithm 38. For example, the vehicle detection algorithm 38 can be based on machine learning techniques, that is, it can be trained by a plurality of images of different vehicles and based on this training the vehicle detection algorithm 38 can detect the presence of at least one vehicle 20 on an image 36. Hence, the detector processing unit 34 can process the provided sensor data 36 (e.g. images 36) to detect the presence of vehicles 20 and can output a list of potentially detected vehicles 37—indicating the vehicles 20 that were potentially detected.

A similar object detection algorithm 38, as discussed in the above example, can be generalized for other types of objects 20, such as, bikes 20, traffic signs 20, pedestrian 20 and/or other occlusions 20 and other types of sensor data 36, such as, radar image 36 (obtained from a radar 32), range image 36 (obtained from a ToF camera 32), etc.

Further, the detector processing unit 34 can be configured for detecting static and/or moving objects 20. Continuing the above example, the detector processing unit 34 can process a sequence of multiple images 36 to determine if the detected vehicles 20 are static or moving. Alternatively or additionally, the detector processing unit 34 can use sensor data 36 from other sensor devices 32. For example, radar data 36 from a radar 32 can be used by the detector processing unit 34 to estimate velocity of detected vehicles 20 and/or distance to the detected vehicles 20. Alternatively or additionally, a ranging image 36 from a ToF camera 32 can be used to further estimate distance to the detected vehicles 20. Similarly, the moving state of other types of objects 20, such as, the moving state of bikes 20, pedestrian 20 and/or other occlusions 20 can be estimated.

The type of sensor devices 32 and/or object detection algorithm 38 and/or type or size of object 20 intended to be detected can determine the size and shape of the detection area 33. The detection area 33 comprises the surrounding of the sensor device 32 within a certain range. For example, for a camera 32 the detection area 33 can be the field of view of the camera 32. Similarly, for a radar 32 and other sensor devices 32 the detection area 33 can be limited by the sensing rage of the respective sensor device 32.

Further, the detection area 33 can be influenced not only by the sensor device 32, but also by the object detection algorithm 38. For example, a more sensitive or efficient algorithm 38 can comprise a larger detection area 33 than a less sensitive or efficient one. Further still, the detection area 33 can also be dependent on the type of object 20 that can be detected. For example, a truck 20 can be detected from a larger range compared to a smaller car 20. Thus, the detection area 33 can be larger for larger objects 20. In general, the detection area 33 can constitute a region of the surrounding of the sensor device 32 wherein at least one object 20 can be detected.

As discussed, the detector processing unit 34 (and/or the object detection algorithm 38) can be configured not only to detect an object 20 but to also extract information relevant to the detected objects 20, such as, type of detected object, e.g. is it a vehicle, pedestrian, bike, traffic sing, traffic light, tree or other occlusion or traffic participant;

size of detected object, e.g. an estimated size or a determined category based on the estimated size (big, medium, small);

position of detected object, e.g. distance and orientation relative to the sensor device 32;

velocity of detected objects, e.g. static, moving, if moving: speed, direction of movement.

Hence, the list of potentially detected objects 37 may also comprise further information related to the detected objects 20.

For example, in FIG. 3 four objects 20 are depicted within the detection area 33, wherein objects 20C and 20B are moving (depicted by an arrow originating in the objects centre and indicating direction of movement) and objects 20A and 20D are static. In the depicted scenario, the potentially detected objects 37 may comprise: [20A, 20B, 20C, 20D]-indicating that objects 20A, 20B, 20C and 20D are present in the detection area 33. The potentially detected objects 37 may alternatively comprise: [{20A, static}, {20B, leaving}, {20C, moving, approaching}, {20D, moving, static}]—indicating not only the detected objects 20 but also further information regarding the state of movement of the detected objects 20. The list of potentially detected objects 37 may also comprise additional information regarding the detected objects 20, such as, type, size, position, velocity.

Alternatively, the potentially detected objects 37 may comprise only hazardous objects 20, that is, only objects 20 that provide a high chance of colliding with or a higher dangerous level. In the provided example in FIG. 3, objects 20A and 20C are nearer to the sensor device 32 hence can be more hazardous then the objects 20B and 20D. Thus, the potentially detected objects may comprise: [20C, 20A], which can be associated with further information regarding the respective hazardous detected object 20.

Additionally, the sensor detector processing unit 34 can output respective object scores 35. The object score 35 may be provided as a number, within a certain range (such as, 1 to 100). The object score 35 can indicate the probability that an object is detected—i.e. the probability that a potential object 37 is an actual object 20. The object score 35 may therefore also be referred to as detection probability 35. That is, for each actual object 20 in the detection area 33 one of the following can occur:

object is detected (i.e. true positive);

object is not detected (i.e. false negative).

Similarly, for each detected object 37 in the list of potentially detected objects 37 one of the following can occur:

object is not present (i.e. false positive or false alarm);

object is present (i.e. true positive).

Usually detector devices can be prone to errors and do not always provide a true positive or true negative outcome. In other words, a detector apparatus 30 may yield false results. That is, a detector apparatus 30 may detect an object, when, in fact, there is no such object (this is a false positive), or may not detect an object that, in fact, is present (false negative).

Thus, the detection probability of the detector apparatus 30 can be taken into account when assigning an object score 35 to a potentially detected object 20. It will be understood that the sensor device 32 (e.g., the camera) provides sensor data 36 (e.g., images). The detector processing unit 34 may analyse the sensor data 36 (e.g., the images), e.g., by a pattern recognition algorithm, and may thus arrive at a finding. A potential finding may be that there is an approaching car in the sensor data 36. However, in fact the detector processing unit 34 may not only arrive at such a definite finding, i.e., a "yes" or "no" finding, but may arrive at a probabilistic finding, expressed as an object score. That is, instead of the binary finding "There is an approaching car", the detector processing unit 34 may also provide the result "The probability of there being an approaching car is 90%".

Different aspects may influence such probabilities. For example, a camera 32 configured with a higher resolution can be more accurate (i.e. comprise a higher detection probability) compared to a camera 32 configured with a lower resolution. Thus, a camera 32 with a higher resolution may generally give rise to higher probabilities. Similarly, different sensor devices 32 may be differentiated based on the accuracy of their outcomes. Hence, objects detected by more accurate sensor devices 32 may comprise a higher probability, which may also be referred to as a higher object score 35.

Alternatively or additional to the accuracy of respective sensor device 32, characteristics of the object 20, such as, type, position, velocity, size, can impact the object score or probability 35. For example, larger objects 20 may have better chances of detection compared to smaller objects 20. Similarly, slow-moving objects 20 and/or objects 20 that are nearer to the sensor device 32 may have better chances of detection. Hence, when the object score 35 indicates the correctness of detection, objects 20 with a better chance of detection may be assigned a higher probability or score 35 (in this case higher score indicating that the object 20 is detected) based on the type and/or position and/or velocity and/or size of the potentially detected object 37.

In the above, the probability or object score 35 was described indicating a probability of detection for the respective object 20. However, the object score 35 can also be configured to indicate a dangerous level (or hazardousness) of an object 20. That is, some objects 20 may impose a more dangerous scenario than other objects 20, e.g. objects 20C and 20A can be more dangerous than objects 20B and 20D. Generally, fast moving objects 20, nearer objects 20, large objects 20 can impose more danger. Similarly, vehicles 20 may impose more danger compared to bikes 20 or pedestrians 20. Thus, based on the type and/or size and/or velocity and/or position of the object 20 the object score 35 can be configured to indicate a dangerous level of the object 20.

Moreover, the correctness of detection and the hazardousness of an object 20 may be combined into one object score 35 that can be assigned to the object 20.

In the above, the detector processing unit 34 is described as being part of the detection apparatus 30. However, in some embodiments, the detector processing unit 34 can be integrated (or comprised by) the data processing unit 40 and more particularly by the robot data processing component 40A. In such embodiments, the sensor data 36 can be directly fed to the data processing unit 40, which can be configured to execute the object detection algorithm 38 and determine a list of potentially detected objects 37 and object scores 35.

That is, while in FIG. 2 the detector apparatus 30 comprising the detector processing unit 34 (cf. FIG. 3) is depicted to be separate from the data processing unit 40, this exact configuration is not necessary. Generally, it is also possible that the detector apparatus 30 comprising at least one sensor 32 generates sensor data 36 that can then be analysed for the presence or absence of objects. This analysing step can be performed by a data processing unit 40, which can be (at least partially) integrated in the detector apparatus 30 (as is the detector processing unit 34 in FIG. 3). However, in other embodiments, it is also possible that the data processing unit 40 is separate from the detector apparatus 30.

It will be understood that, e.g., for robotic behaviour, the detection probability 35 of an object may need to be "translated" or "transformed" to a definite detection. For example, in the scenario depicted in FIG. 1 (*a*), the robot 10, and more particularly the detector apparatus 30 (c.f. FIG. 2 (*a*)), may detect that a car 20 is approaching and intersecting the travel route of the robot 10 with a probability of 85%. The robot 10 then needs to decide whether to continue its operation or not. To do so, it is desirable to translate the probability into a binary finding of "Yes, there is a car approaching" or "No, there is no car approaching". Alternatively, the binary findings may also be behaviours, such as "Yes, take a safety measure" and "No, continue normal operation".

To transform the probabilities, which may also be referred to as detection probabilities, to binary findings, a detection probability threshold may be defined, which can also be referred to as a detection threshold. A probability above this threshold will be transformed to a positive detection, and a probability at or below this threshold will be considered not to be a detection.

As a first example, when setting the threshold to 90%, only probability findings above 90% will be considered to be a detection. As a further example, when setting the threshold to 80%, probability findings above 80% will be considered to be a detection. It will be understood that in the first case, fewer events will be considered to be a detection, while in the latter case, more event will be considered to be a detection.

It will further be understood that setting the detection threshold will have implications on the operation of the robot 10. E.g., when the detection threshold is set to a low value, overall, the percentage of positive detection results is increased, i.e., the percentage of true positives (also referred to as "sensitivity") and false positives is increased. This allows for a safer operation of the robot 10. For example, most of the cars potentially endangering the robot 10 would be detected. However, by a low detection threshold, also the number of false positives would be increased. Thus, the robot 10 will take safety measures (e.g., stopping and waiting) more often than with a higher detection threshold. This will decrease the efficiency of the operation of the robot 10.

Conversely, a higher detection threshold would lead to fewer situations being considered to be a positive detection, i.e., the percentage of positive results would be lower. That is, a higher detection threshold would lead to fewer true positive and fewer false positive results. Reducing the number of false positive results (e.g., fewer detection of cars when there is actually no car) will render the operation more efficient, as there will be fewer instances when the robot 10 stops its normal operation and/or starts another safety routine. However, reducing the number of true positive results (that is, increasing the number of false negative results) leads to the robot 10 detecting a smaller percentage of the cars that actually are in the robot's surrounding, which may increase the risk of accidents.

Thus, embodiments of the present technology provide routines for setting the detection threshold 43 to values trying to optimize both safety and efficiency of operation. Further details of this will be described below.

Figure 4:
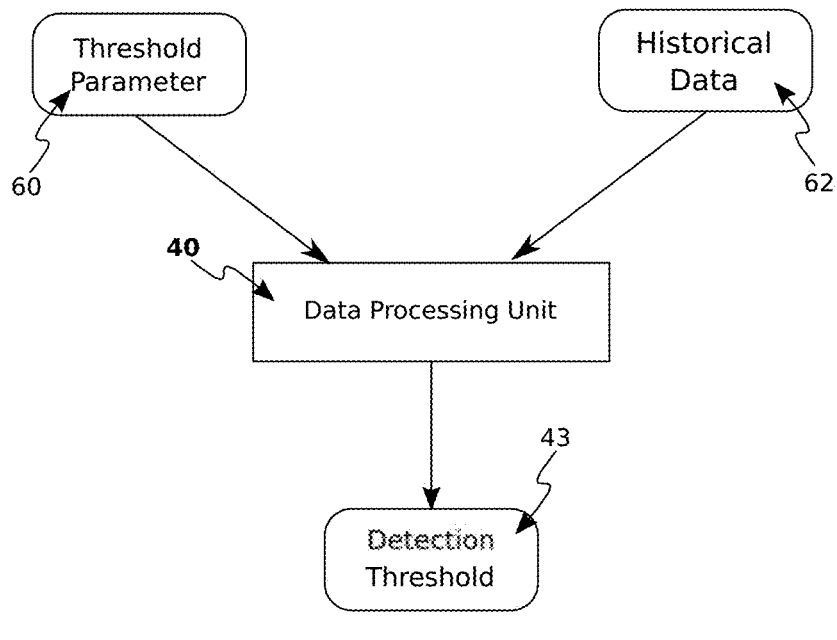
FIG. 4 depicts a data processing unit configured for setting detection thresholds and determining a score-to-decision mapping.
Figure 4:
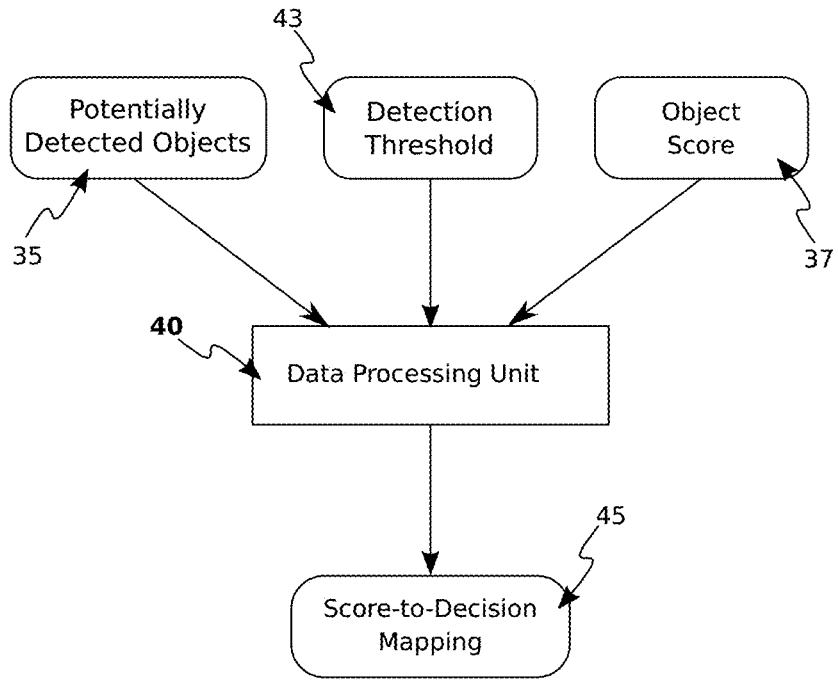

FIG. 4 depicts a data processing unit 40 for setting the detection threshold 43. As discussed, the data processing component 40 may be (at least partially) comprised by the robot 10 and/or by an external server. The data processing unit 40 can be configured to set at least one detection threshold value 43 based on threshold parameters 60 and historical data 62 (FIG. 4*a*). Further, the data processing unit 40 can be used to evaluate the outcome of the detector apparatus 30. That is, the data processing unit 40 can be configured to receive at least one probability or object score 35 and map it to predefined categories or decisions based on at least one detection threshold 43 and output a score-to-decision mapping 45 (FIG. 4*b*).

As discussed with respect to FIG. 3, the probability or object score 35 may be used by the data processing unit 40 for determining a decision. One such decision can be whether the potentially detected object 37 is considered as a detected object or not. Another decision can be whether a potentially detected object 37 is hazardous or not, e.g. based on the probability of a collision with the object. Hence, a mapping between an probability/object score 35 and a discrete (e.g., binary) result/decision 45 can be advantageous.

For example, in the scenario depicted in FIG. 1, the mobile robot 10 needs to determine whether to cross the road 22. In other words, a binary decision "cross" or "do not cross" needs to be determined. This decision can be based on an evaluation of the scenario on the respective road crossing. Thus, the mobile robot 10 can evaluate the road crossing using the detector apparatus 30. That is, the mobile robot 10 can detect the vehicle 20 and can further assign a probability or score 35 to the vehicle 20 (as described before). Then, using a detection threshold 43, the robot 10 can determine whether the vehicle 20 is considered to be detected and/or whether vehicle 20 is hazardous and/or whether to cross the road. Such binary decisions can be facilitated by the data processing unit 40 determining a binary mapping 45 (i.e. score-to-object mapping 45) of the object probability or scores 35 into "cross" or "do not cross". Yet another binary mapping 45 can be "hazardous object" or "not hazardous object". Based on the mapping 45, the robot 10 can determine an action, that is, can either cross the road 22 or can wait.

Furthermore, the data processing unit 40 may categorize (i.e. map) the object scores 35 in more than two categories or decisions. That is, the data processing unit 40 can be configured to generate a score-to-decision mapping 45, wherein the object scores 35 can be mapped into at least two categories (or decisions). This may require the use of more than one detection thresholds 43. For example, if the object scores 35 can be mapped into three decisions 45, then at least two detection thresholds 43 are required.

In one particular example, the mobile robot 10 can be configured to cross the road in one of the three following modes: automatically and autonomously (i.e. the robot 10 automatically determines if or when to cross the road and the robot 10 autonomously crosses the road), operator-triggered crossing (i.e. an operator authorizes the crossing but the robot crosses the road autonomously once authorized) and operator-controlled crossing (i.e. an operator assists the robot through the entire road crossing). Thus, the robot 10 needs to determine before or at the road crossing in which of the three modes to cross the road. Hence in this scenario, the object scores 35 can be mapped into one of three road crossing modes—which may require the use of at least 2 detection thresholds 43.

Figure 5:
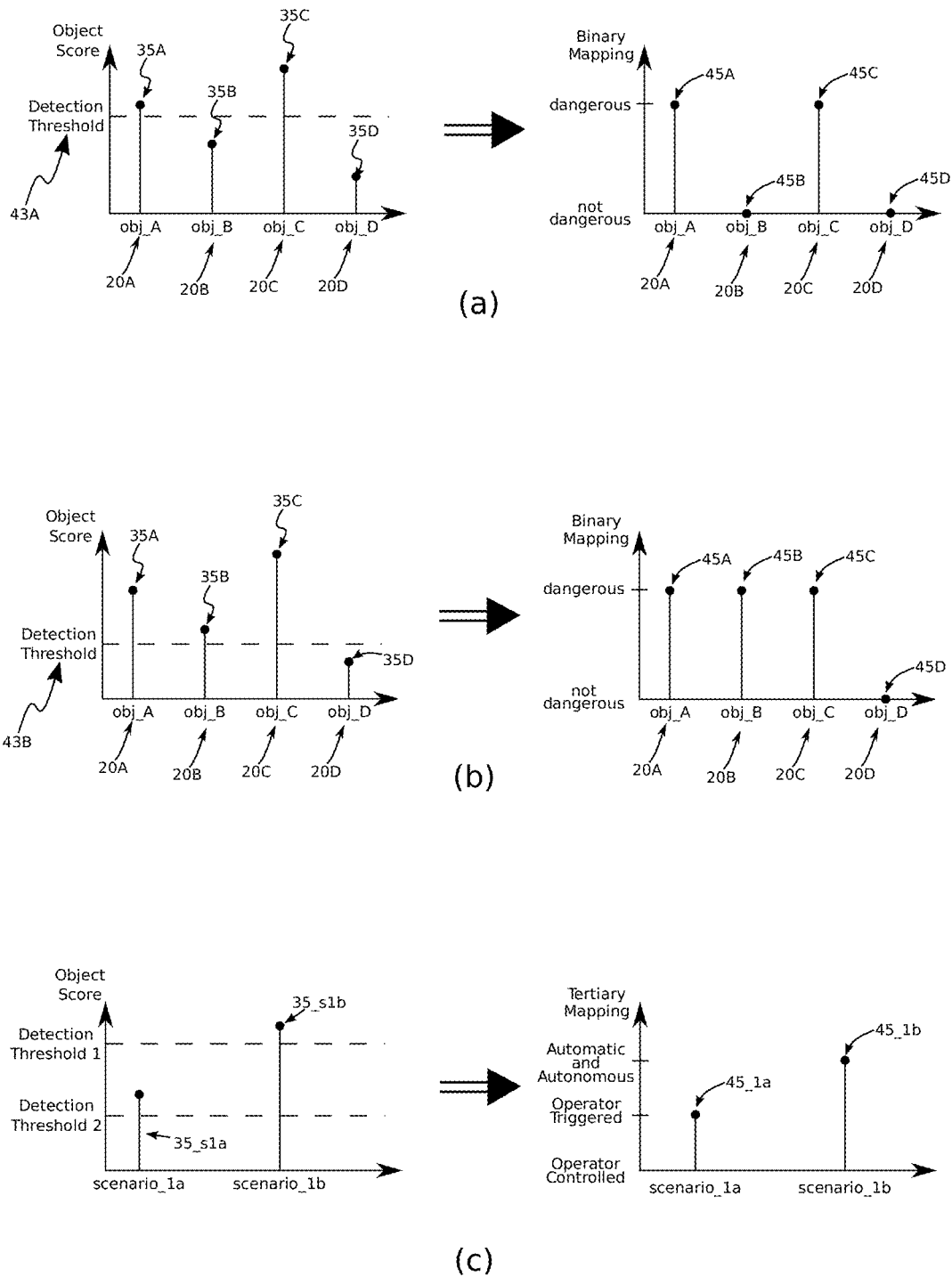
FIG. 5 illustrates the influence of detection threshold value on the score-to-decision mapping.

FIG. 5 provides examples of score-to-decision mappings 45.

The first plot in FIG. 5a depicts the object scores 35A, 35B, 35C and 35D of respective detected objects 20A, 20B, 20C and 20D (see FIG. 3). It can be noticed that objects 20A and 20C comprise a higher score than objects 20B and 20D. Further, the binary mapping 45 may relate to determining for each object 20 whether it is hazardous or not (i.e. "dangerous" or "not dangerous")—however, it will be understood that this is merely exemplary and that other mappings 45 (such as "car detected") may also be possible. As it is a binary decision, one detection threshold 43 can be used. In the provided example in FIG. 4a, the detection threshold 43A is used. Using the detection threshold 43A the binary mapping 45 determines that object 20A and 20C are dangerous and that objects 20B and 20D are not dangerous.

FIG. 4b depicts the same scenario as FIG. 4a. That is, the object scores 35 of objects 20A, 20B, 20C and 20D (see FIG. 3) are mapped into "object is dangerous" and "object is not dangerous". However, in the mapping of FIG. 4b a different detection threshold 43B is used. More particularly, a lower detection threshold 43B is used, hence recognizing objects 20A, 20B and 20C as dangerous and object 20D as not dangerous.

Hence, as illustrated in the above two examples, the detection threshold 43 influences the score-to-decision mapping 45. In other words, for the same object scores 35, different detection thresholds 43 may result in different mappings 45. Some detection thresholds 43, which can be referred as less sensitive thresholds 43 (e.g. detection threshold 43A in FIG. 4a) may cause fewer objects 20 to be detected and/or determined as dangerous, while other detection threshold values 43, that can be referred as more sensitive thresholds 43 (e.g. detection threshold 43B) may cause more objects to be detected and/or determined as dangerous.

On the one hand, it can be advantageous to have a less sensitive threshold 43 as it can reduce false positive rate, or detection of artefacts or taking unnecessary precautions or waiting. For example, a less sensitive threshold 43 can cause the robot 10 in FIG. 1b to determine the vehicle 20 as not dangerous, hence avoiding the unnecessary waiting. However, less sensitive thresholds 43 may also cause the increase of false negatives—i.e. an object may not be detected though it is present. For example, a less sensitive threshold 43 may cause the robot 10 in FIG. 1a to not detect the vehicle 20 which may render a dangerous scenario or a collision between the robot 10 and the vehicle 20.

On the other hand, it can be advantageous to have a more sensitive threshold 43, as it can increase the number of detections. This can allow the robot 10, in FIG. 1a, to correctly detect vehicle 20 and/or determine it is dangerous—hence avoiding a collision. However, more sensitive thresholds 43 may cause an increase in the number of false positives too, i.e. a detection is determined though the object is not present. For example, in FIG. 1b the robot 10 may determine that vehicle 20 is dangerous and hence take precautions, such as, wait for the vehicle 20 to pass. Clearly, it is unnecessary for the robot 10 to wait for the vehicle 20 to pass in FIG. 1b.

Thus, the selection of the detection threshold 43, can be a trade-off between the beneficial objects of increasing the true positive rate, decreasing the false positive rate, decreasing the false negative rate, and increasing the true negative rate. Similarly, the selection of the detection threshold 43 can be a trade-off between ensuring maximum safety (i.e. any object present is detected and/or correctly determined as dangerous or not dangerous) and avoiding taking unnecessary precautions (i.e. decreasing false positive rate). The optimal detection threshold 43 would ensure maximum safety (i.e. all or nearly objects would be correctly detected) while avoiding taking unnecessary precautions (i.e. zero or almost zero false positive rate).

The data processing unit 40 can be configured to determine such optimal (or at least nearly optimal) detection thresholds 43. The setting and/or adjusting of the at least one detection threshold 43 can be based on at least one threshold parameter 60 (which may also be referred to as detector parameters 60) and historical data 62, as depicted in FIG. 4a.

The detector or threshold parameters 60 can comprise context information related to when an object 20 is detected.

The threshold parameters 60 can comprise static environment parameters 60, which indicate the type of environment wherein an object can be detected. For example, the static environment parameters 60 can indicate whether the environment comprises a road, road crossing, sidewalk, driveway. It can further indicate, when the environment comprises a road, the type of the road, lanes of the road, heaviness of the traffic on the road. It can also indicate, when the environment comprises a road crossing, the type of crossing, e.g. a driveway crossing, railway crossing, car-road crossing. It can further comprise information related to traffic laws, e.g. speed limits, presence of traffic lights, direction of one-way or multi-way roads. Generally, the static environment parameters 60 can comprise data related to an environment that do not change frequently or that do not require frequent updates (such as daily or hourly updates). Thus, the static environment parameters 60 can be stored in a memory location (such as, at the server 50, see FIG. 1) and can be accessed when needed to evaluate an environment. The detection threshold 43 can be adjusted based on such static environment parameters. For example, more sensitive thresholds 43 can be selected when crossing a road compared to the instances when driving in a sidewalk. Similarly, the detection thresholds 43 may be adjusted to more sensitive values in roads with high average traffic.

The threshold parameters 60 can comprise a location 60 of the environment wherein an object can be detected. The location 60 can allow to identify the environment. Hence, static environment parameters 60 can be associated to a location 60.

The threshold parameters 60 can comprise a detection time 60. The detection time 60 can comprise a time of the day (e.g. hour), day of week, holiday, rush hour. The detection time 60 can allow an estimation on the expected traffic, e.g. on rush hours on a working day, an increased number of traffic participants can be expected. Thus, the detection threshold 43 can be adjusted accordingly based on detection time 60, e.g., during rush hours more sensitive thresholds 43 can be used.

The threshold parameters 60 can comprise weather parameters 60, such as, rainy, foggy, windy, snowy—conditions which can interfere with the sensors 32 of the detector apparatus 30 (see FIG. 3). For example, fog may decrease the visibility of cameras 32, hence more sensitive thresholds 43 may be required to ensure detection of objects.

The threshold parameters 60 can comprise an amount of supervision 60 or operator availability 60, which can indicate the availability of a human operator to monitor or control a mobile robot 10. The operator availability 60 may be a parameter (such as a score) that can be preselected by the operator. It may also be a parameter determined based on the number of mobile robots 10 that a human operator may be supervising (monitoring and/or controlling). Further, the operator availability may be correlated to the type of environment, e.g. in a road crossing it can be expected more supervision from the operator than while driving on a sidewalk. Further still, the operator availability 60 may be determined by the robot 10, e.g. based on the ratio of the time that the robot 10 has been monitored and/or controlled by an operator and the time the robot 10 has been driving autonomously. Hence, if operator availability 60 is high, a more sensitive threshold value 43 can be selected, otherwise a less sensitive threshold 43 can be selected.

The threshold parameters 60 can comprise a visibility parameter 60 that can indicate the visibility of the sensors 32. The visibility parameter 60 can depend on the environment parameters 60 (such as whether parameters). The visibility parameter 60 can also depend on the number of occlusions present on the environment. For example, cars parked on the side of the road may block the view of the sensors 32 to the road. Other occlusions may be caused by trees, other traffic participants, traffic sings, buildings, etc. When the amount of occlusion is high, or more generally when the visibility parameter 60 indicate low visibility of sensors 32, a more sensitive threshold 43 can be advantageous.

The threshold parameters 60 can comprise distance travelled on the road crossing. Obviously, this parameter can be valid when crossing a road crossing. That is, it can be advantageous to have the robot 10 be more "cautious" when the robot 10 is at the beginning of the road crossing (e.g. it can allow the robot to jump back and not continue crossing the road). Hence, more sensitive thresholds 43 can be selected at the beginning of the road crossing and the sensitivity of the threshold 43 can decrease (e.g. linearly) with the increase of the distance travelled in the road crossing. That is, before and at the beginning of the road crossing, the detection threshold may be relatively low (thus having a high sensitivity), and then during the road crossing, the detection threshold may increase (thus, decreasing the sensitivity).

The threshold parameters 60 can comprise events happening in the vicinity of the environment. For example, if an accident is detected, then more sensitive thresholds 43 can be selected. Generally, it will be understood that lower detection thresholds are more sensitive, while higher detection thresholds are less sensitive.

The threshold parameters 60 can comprise the amount of time waited before executing the crossing. For example, at the beginning more sensitive threshold values 43 (i.e., lower detection thresholds) can be selected and the sensitivity can be decreased (i.e., higher detection thresholds can be used) with the increase of the waiting time. This can decrease the amount of waiting.

As illustrated above, the one or more threshold parameters 60 can be considered for setting and/or adjusting a detection threshold 43. The threshold parameters 60 provide more insight into the environment where and/or time when an object 20 is detected. Thus, the context where and/or when the object is detected can be considered before setting and/or adjusting a detection threshold 43. Each threshold parameter 60 can cause the detection threshold 43 to become more or less sensitive. Further, the threshold parameters 60 can be weighted by weighting constant—hence allowing for the construction of a prioritization scheme of the impact a threshold parameter 60 can have on the setting of the detection threshold 43.

Further, historical data 62 can be considered while setting the at least one detection threshold 43. Historical data 62 can comprise recorded data 62 which can allow previous experiences to be taken into account while setting detection threshold values 43.

Historical data 62 may comprise historical safety records 62 of a particular environment, such as, a road or road crossing. The historical safety records 62 may indicate the number of dangerous scenarios, such as number of accidents, that have happened in the particular environment, e.g. in a road crossing. The historical safety records 62 may be provided by a respective authority collecting such data. Alternatively or additionally, the safety records 62 may be collected by mobile robot 10 (or multiple mobile robots 10) which can be configured to record dangerous scenarios, such as collisions.

The historical safety record 62 for an environment can allow an estimation of the expected dangerous level on the environment. For example, if frequent accidents happen at a road crossing then a high dangerous level can be expected on that road crossing. Additionally, historical safety records 62 for a particular environment can be used to evaluate the dangerous level of a similar environment. For example, historical safety records 62 of a particular road crossing can be used to estimate the expected dangerous level of nearby road crossings. The historical safety record 62 may also relate to historical road safety in a particular region, city or country.

Historical data 62 may also comprise previous experiences 62, i.e. previous object detections. For example, when an object 20 is detected, usually information such as, type of object, distance to object, size of object, velocity of object, location of detection, type of environment and/or data related to the threshold parameters 60 can be obtained. In other words, information regarding the object 20 and the environment where and/or time when the object 20 is detected can be obtained. Such information can be stored in the form of historical data 62.

Preferably, an additional step can determine whether the detection was true or false. That is, in some instances the detector apparatus 30 (see FIG. 3) may output false detections, e.g. an object is detected though not present. The previous experiences 62 can be used for testing (i.e. as testbeds) at least one detection threshold value 43. That is, using the previous experiences 62, detection threshold values can be tested. For example, if the object is detected while processing the previous experiences data 62 with a particular detection threshold value 43, and it is known before testing that the previous experience 62 relate to true positive detections, then the detection threshold value 43 can be considered as a "good" value, i.e. a value that produces correct result.

For example, in the scenario of FIG. 1a the robot 10 may detect the vehicle 20. The robot 10 may further record this detection as a previous experience 62. During the recording of the previous experience 62 the robot 10 may record sensor data 32 (see FIG. 3), such as, images, videos, radar images, range images, etc. Alternatively or additionally, the robot may store, in the previous experience data 62, intermediate results during the processing of the sensor data 32, such as, the type of detected object (i.e. vehicle), velocity of the object, size of the object (such intermediate results may also be referred to as processed sensor data). Additionally, information regarding the environment where the object is detected may be stored in the previous experience data 62, such as, location and/or type of environment (i.e. road crossing). Additionally, information regarding the time when the object is detected may be stored in the previous experience data 62.

Hence, the previous experiences 62 can allow to identify objects, object characteristics, environments, and/or environment parameters that can be dangerous. Furthermore, the previous experiences 62 can allow to identify for certain object types and/or environments and/or times, detection threshold values 43 (or combination of different threshold values 43).

As depicted in FIG. 4b and illustrated in FIG. 5 (discussed above), the data processing unit may use at least one detection threshold and output a score-to-decision mapping 45 of the object scores 37.

Generally, it will be understood that the score-to-decision mapping 45 (see FIG. 4), which may also be referred to as probability-to-decision mapping 45, may be employed using data obtained from a plurality of instances by a plurality of mobile robots 10.

In the above, it has been primarily described how a detection threshold 43 can be set to control operation of a robot 10. More particularly, the detection threshold 43 can be set locally on the robot 10 by taking into account historical data (e.g., an average traffic density on a road based on previous recordings) and data relating to the present status of the environment (e.g., weather or visibility conditions). Thus, in a real-world situation, a detection threshold 43 may be set to control the operation of the robot 10.

However, embodiments of the present technology do not only relate to setting the detection threshold in such a real world situation, but to utilizing historical records of sensor data 36 to test new detection algorithms and/or to test setting of the detection thresholds by utilizing such historical records of sensor data 36. Thus, (close to) ideal settings for the detection thresholds 43 may be found also for new detection algorithms, without having to test such new algorithms in the field. Details of such embodiments relating to testing algorithms and/or detection thresholds will be discussed below.

Generally, a plurality of robots 10 may travel in traffic environments and may generate sensor data 36. This sensor data 36 may then be collected. Thus, a large collection of data of "historical cases" may be created. In some embodiments, the sensor data 36 may just be stored—i.e., the sensor data 36 may be sent from the mobile robots 10 to a server and just be stored here. However, in other embodiments, the sensor data 36 may be processed before storing the same. For example, in case the sensor data 36 comprises images captured by a camera, not all of the images may be stored, but some intermediate results (also called processed sensor data) comprising, e.g., the detected presence of objects, their size, and their velocities may be stored. It will be understood that this processing of sensor data 36 may be performed both by the mobile robots 10 before sending the sensor data 36 (thus, the processed sensor data 36 would be sent to the server) or by the sever after sending the "raw" sensor data 36 (thus, the "full" or "unprocessed" sensor data 36 may be sent from the mobile robots 10 to the server). This sensor data 36 may be annotated with optimal robot behaviour, i.e., for each such case, it may be added what the ideal behaviour of the robot would have been (e.g., "wait", "continue normal operation", "ask assistance from a remote operator"). That, a large collection of historical cases may be provided in which additional information is added in the form of the optimal robot behaviour. This allows finding of False Positives, e.g. situation where a car driving parallel to robots' crossing intent is incorrectly classified as a potential turning car. The false positive rate (amount of false positives out of all the cases) may be pre-determined, e.g., by business interests to maintain high average speed while obtaining maximum safety. False positive rate depends on how often robot reacts to potentially dangerous situations which is in turn dependant on the probabilities detectors output.

The real world performance may differ by location, time, weather and other detectors performance. Thus, modelling of such a system becomes ever increasingly difficult. In embodiments of the present invention, it is computationally tractable to choose the probability thresholds (which may also be referred to as sensitivity thresholds) empirically from historical data.

To do so, the collection of data of historical cases may be used to "replay" these situations and then compute results with the most recent implementation (i.e., with the latest software and the latest detectors). Thus, vast amounts of historical data may be reused.

In order to set or compute the detection thresholds (also referred to as sensitivity thresholds) an equilibrium point has to be found between the maximum amounts of errors acceptable against catching every instance that is dangerous.

It will be understood that finding positive (e.g., dangerous) cases is very difficult and is prone to causing real-world damage because positive may by definition mean that there is a chance of an accident. Thus, the above discussed "reusage" of historical sensor data 36 to test new algorithms or routines is very beneficial, as it allows to test such new algorithms or routines with old data. That is, such new algorithms or routines may be tested without endangering any traffic participants.

Further, reference can also be made to the application EP 18200330.1, which is incorporated herein by reference in its entirety. The technology disclosed in this application allows the automatic collection of positive cases and to then ask questions about safety at large scale which would be hard (or in fact impossible) by human annotation.

Put differently, if the detectors by integrating all of the meta-data already gave perfect probabilities then the herein described threshold selection (which may also be referred to as sensitivity selection) would not be necessary. However, it has turned out that the herein described selection of the detection threshold is beneficial, as prior results have been far from optimal.

In the above, it has been described that sensor data 36 can be used to arrive at probabilities or scores 35. It has further been described that the present technology relates to setting detection thresholds to translate these probabilities or scores 35 to discrete findings (such as binary findings, e.g., "Car detected", "Car not detected"), and to test these findings, e.g., by using historical sensor data.

It will be understood that storing the complete sensor data (e.g., video data) may require vast amounts of data storage space. Thus, in embodiments of the present technology, not the complete sensor data is stored for further testing, but intermediate results based on the sensor data, which may also be referred to as processed sensor data. An example for intermediate value characteristics about a car may be its speed, position and size. From these intermediate value characteristics, detector algorithms may calculate a score (e.g., score indicating how dangerous the car is or how likely it is that this car intersects the robot's trajectory). In other words, from these intermediate value characteristics, an empirical probability that this car is dangerous may be calculated.

That is, not the complete history with large files like sound, videos, images etc., may be saved, but instead, some intermediate results just before the detector probability is calculated are saved. The technology described in EP 18200330.1 may also be used to obtain truth-value for the detector algorithm and therefore start learning a mapping function that maps the intermediate results to the best guess for the probability.

Generally, it will be understood that the sensor data and also the above described intermediate characteristics (i.e., processed sensor data), for a plurality of robots in a plurality of instances, results in a huge collection of annotated data that may be stored in servers. This data can be used to find the detections by the detectors (i.e., by the detector algorithms). Then, different detection thresholds ("sensitivity combinations") may be tested on this data. Generally, some amount of false positives may be set or pre-determined. That is, one may set the number of false positives that would still be acceptable. For that level of false positives, embodiments of the present technology may find a best combination of detection thresholds such that the total recall of detected cars would be maximum.

Figure 6:
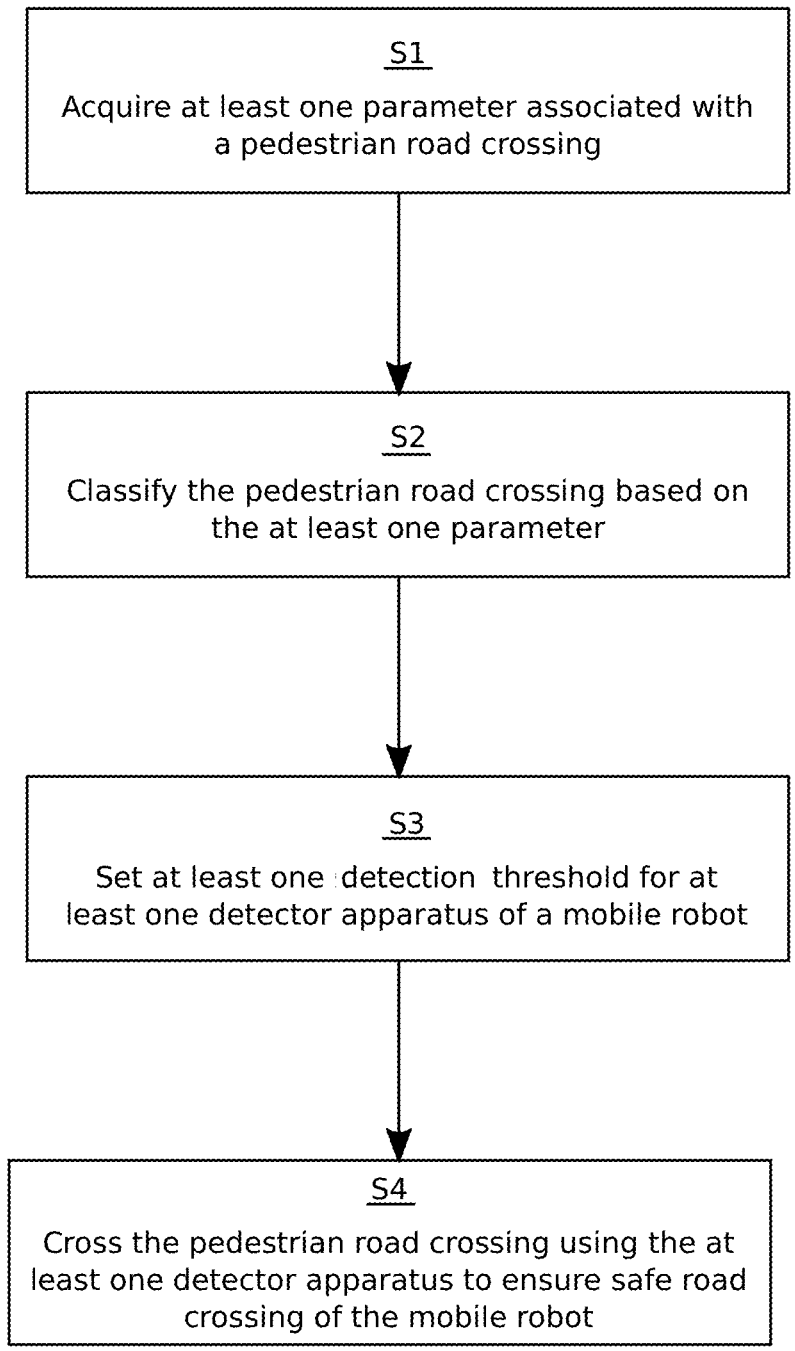
FIG. 6 depicts a method employing a mobile robot crossing a road crossing comprising setting at least one detection threshold for at least one detector of a mobile robot.

FIG. 6 depicts a method employing a mobile robot 10 crossing a road crossing comprising setting at least one detection threshold for at least one detector of a mobile robot 10, according to embodiments of the present technology.

In a first step S1, the method can comprises acquiring at least one parameter associated with a pedestrian road crossing. The at least one parameter may comprise information regarding the environment (e.g. road crossing). The at least one parameter of the road crossing (e.g. type of road, number of lanes, traffic heaviness, occlusions, visibility, weather conditions) may be acquired by the robot 10, such, by the detector apparatus 30 of the robot 10. Further parameters (e.g. traffic laws, historical safety), may be inferred based on the location of the road crossing and time.

In a second step S2, the method can comprise classifying the pedestrian road crossing based on the at least one parameter. That is, the at least one parameter of the road crossing may be evaluated. Based on this evaluation or classification of the road crossing, in a step S3, at least one detection threshold 43 for at least one detector apparatus of the mobile robot 10 can be set. For example, step S2 and S3 may be carried out by the data processing unit 40 as discussed in FIG. 4a.

Further, in a step S4, the robot 10 may cross the pedestrian road crossing using the at least one detector apparatus to ensure safe, fast and smooth road crossing of the mobile robot 10. That is, the robot 10 may detect at least one object 20 using the detector apparatus 30, as discussed in FIG. 3. Further, the robot 10 may determine whether the detection was correct and/or whether the detected objects are dangerous. This determination can be carried out by the data processing unit 40, that can map object scores 35 by computing a score-to-decision mapping 45, as discussed in FIG. 4b. Based on this, the robot 10 may cross the road or may wait (for the road to be cleared).

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

The invention claimed is:

1. A method for operating a robot traveling in an environment, the method comprising:
the robot sensing the environment and thereby creating sensor data;
generating at least one probabilistic finding based on the sensor data, wherein the probabilistic finding is expressed as an object score and wherein the object score indicates a probability of detection of an object;
setting at least one detection threshold; and,
based on the at least one detection threshold, transforming the at least one probabilistic finding based on the sensor data to at least one discrete finding,
wherein the method is for operating a robot crossing a road,
wherein
the robot is configured to be controlled by at least one human operator when crossing the road, and wherein
setting the at least one detection threshold is based on a level of supervision by the at least one human operator when crossing the road.

2. The method according to claim 1,
wherein, in the transforming, a probabilistic finding below a detection threshold is transformed to a first finding and a probabilistic finding above the detection threshold is transformed to a second finding, the second finding being different from the first finding.

3. The method according to claim 2,
wherein the robot is configured to request assistance from at least one human operator,
wherein setting the at least one detection threshold is based on an availability of the at least one human operator, and
wherein the method further comprises:
the robot crossing the road without requesting assistance from the at least one human operator in response to the first finding; and
the robot requesting assistance from the at least one human operator in response to the second finding.

4. The method according to claim 1, wherein the method is carried out by a data processing system comprising a data processing device external to the robot, wherein the method comprises:
a plurality of robots sensing the environment and thereby creating the sensor data;
transmitting the sensor data from the plurality of robots to the data processing device; and
the data processing device performing at least one detection algorithm utilizing the sensor data to generate the at least one probabilistic finding.

5. The method according to claim 4, wherein
the at least one detection algorithm is a plurality of detection algorithms generating a plurality of probabilistic findings, and
wherein the method comprises for each detection algorithm:
setting a detection threshold combination comprising a detection threshold for each probabilistic finding,
utilizing the detection threshold combination to generate a discrete finding for each probabilistic finding, and
testing a validity for the detection threshold combination.

6. The method according to claim 5,
wherein testing the validity for the detection threshold combination comprises testing an individual finding validity for each discrete finding,
wherein the individual finding validity results in either one of a true positive finding, a true negative finding, a false positive finding, and a false negative finding,
wherein the detection threshold combination thus comprises a true positive rate, a true negative rate, a false positive rate, and a false negative rate.

7. The method according to claim 5, wherein the method comprises:
setting a plurality of detection threshold combinations, each detection threshold combination comprising a detection threshold for each probabilistic finding,
utilizing each of the detection threshold combinations to generate a discrete finding for each probabilistic finding,
testing a validity for each of the detection threshold combinations.

8. The method according to claim 7,
wherein, for each detection threshold combination, testing the validity comprises testing an individual finding validity for each discrete finding,
wherein the individual finding validity results in either one of a true positive finding, a true negative finding, a false positive finding, and a false negative finding,
wherein, for each detection threshold combination, the detection threshold combination thus comprises a true positive rate, a true negative rate, a false positive rate, and a false negative rate.

9. The method according to claim 8, wherein the method comprises:
setting a false positive rate, and
finding the detection threshold combination having a false positive rate not exceeding the set false positive rate and having the highest true positive rate of the plurality of detection threshold combinations.

10. The method according to claim 4, wherein the method further comprises:
processing the sensor data to generate processed sensor data, wherein the at least one detection algorithm utilizes the processed sensor data to generate the at least one probabilistic finding.

11. The method according to claim 10, wherein a ratio of data size between the sensor data and the processed sensor data is greater than 10.

12. A system for carrying out the method according to claim 1, the system comprising a data processing system and a robot.

13. The method according to claim 1, wherein the at least one detection threshold is based on a visibility in the environment.

14. The method according to claim 1, wherein the at least one detection threshold is based on an amount of traffic.

15. The method according to claim 1, wherein the at least one detection threshold is based on a type of the road.

16. The method according to claim 1, wherein the at least one detection threshold is based on a distance traveled when crossing the road.

17. The method according to claim 1, wherein the at least one detection threshold is based on a movement status of the robot.

18. A method for operating a robot traveling in an environment, the method comprising:
the robot sensing the environment and thereby creating sensor data;
generating at least one probabilistic finding based on the sensor data, wherein the probabilistic finding is expressed as an object score and wherein the object score indicates a probability of detection of an object;

setting at least one detection threshold; and, based on the at least one detection threshold, transforming the at least one probabilistic finding based on the sensor data to at least one discrete finding, wherein the method is for operating a robot crossing a road, and wherein setting the at least one detection threshold is based on whether the road crossing is performed automatically or operator-based.

19. The method according to claim 18, wherein the at least one detection threshold is based on a type of the road.

20. The method according to claim 18, wherein the at least one detection threshold is based on a distance traveled when crossing the road.

21. The method according to claim 18, wherein the at least one detection threshold is based on a movement status of the robot.

22. The method according to claim 18, wherein the robot is configured to be controlled by at least one human operator when crossing the road, and wherein setting the at least one detection threshold is based on a level of supervision by the at least one human operator when crossing the road.

23. The method according to claim 18, wherein, in the transforming, a probabilistic finding below a detection threshold is transformed to a first finding and a probabilistic finding above the detection threshold is transformed to a second finding, the second finding being different from the first finding.

24. The method according to claim 23, wherein the robot is configured to request assistance from at least one human operator, wherein setting the at least one detection threshold is based on an availability of the at least one human operator, and wherein the method further comprises:

the robot crossing the road without requesting assistance from the at least one human operator in response to the first finding; and the robot requesting assistance from the at least one human operator in response to the second finding.

25. The method according to claim 18, wherein the method is carried out by a data processing system comprising a data processing device external to the robot, wherein the method comprises:

a plurality of robots sensing the environment and thereby creating the sensor data;

transmitting the sensor data from the plurality of robots to the data processing device; and the data processing device performing at least one detection algorithm utilizing the sensor data to generate the at least one probabilistic finding.

26. The method according to claim 25, wherein the at least one detection algorithm is a plurality of detection algorithms generating a plurality of probabilistic findings, and wherein the method comprises for each detection algorithm:

setting a detection threshold combination comprising a detection threshold for each probabilistic finding, utilizing the detection threshold combination to generate a discrete finding for each probabilistic finding, and testing a validity for the detection threshold combination.

27. The method according to claim 26, wherein testing the validity for the detection threshold combination comprises testing an individual finding validity for each discrete finding, wherein the individual finding validity results in either one of a true positive finding, a true negative finding, a false positive finding, and a false negative finding, wherein the detection threshold combination thus comprises a true positive rate, a true negative rate, a false positive rate, and a false negative rate.

28. The method according to claim 26, wherein the method comprises:

setting a plurality of detection threshold combinations, each detection threshold combination comprising a detection threshold for each probabilistic finding, utilizing each of the detection threshold combinations to generate a discrete finding for each probabilistic finding, testing a validity for each of the detection threshold combinations.

29. The method according to claim 28, wherein, for each detection threshold combination, testing the validity comprises testing an individual finding validity for each discrete finding, wherein the individual finding validity results in either one of a true positive finding, a true negative finding, a false positive finding, and a false negative finding, wherein, for each detection threshold combination, the detection threshold combination thus comprises a true positive rate, a true negative rate, a false positive rate, and a false negative rate.

30. The method according to claim 29, wherein the method comprises:

setting a false positive rate, and finding the detection threshold combination having a false positive rate not exceeding the set false positive rate and having the highest true positive rate of the plurality of detection threshold combinations.

31. The method according to claim 25, wherein the method further comprises:

processing the sensor data to generate processed sensor data, wherein the at least one detection algorithm utilizes the processed sensor data to generate the at least one probabilistic finding.

32. The method according to claim 31, wherein a ratio of data size between the sensor data and the processed sensor data is greater than 10.

33. A system for carrying out the method according to claim 18, the system comprising a data processing system and a robot.

34. The method according to claim 18, wherein the at least one detection threshold is based on a visibility in the environment.

35. The method according to claim 18, wherein the at least one detection threshold is based on an amount of traffic.

* * * * *